US012756946B2

(12) United States Patent
Ozcan et al.

(10) Patent No.: US 12,756,946 B2
(45) Date of Patent: Oct. 6, 2026

(54) CLASS-SPECIFIC DIFFRACTIVE CAMERA WITH ALL-OPTICAL ERASURE OF UNDESIRED OBJECTS

(71) Applicant: THE REGENTS OF THE UNIVERSITY OF CALIFORNIA, Oakland, CA (US)

(72) Inventors: Aydogan Ozcan, Los Angeles, CA (US); Yi Luo, Los Angeles, CA (US); Bijie Bai, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 41 days.

(21) Appl. No.: 18/865,654

(22) PCT Filed: May 12, 2023

(86) PCT No.: PCT/US2023/066929
§ 371 (c)(1),
(2) Date: Nov. 13, 2024

(87) PCT Pub. No.: WO2023/230412
PCT Pub. Date: Nov. 30, 2023

(65) Prior Publication Data

US 2025/0317658 A1 Oct. 9, 2025

Related U.S. Application Data

(60) Provisional application No. 63/345,416, filed on May 24, 2022.

(51) Int. Cl.
*H04N 23/95* (2023.01)
*G06N 3/067* (2006.01)
(Continued)

(52) U.S. Cl.
CPC ............... *H04N 23/95* (2023.01); *G06T 3/04* (2024.01); *G06V 10/82* (2022.01)

(58) Field of Classification Search
CPC ....... H04N 23/95; G06N 3/067; G06N 3/0675
(Continued)

(56) References Cited

U.S. PATENT DOCUMENTS 9,946,970 B2 * 4/2018 Gilad-Bachrach ....... G06N 3/08
10,740,693 B2 * 8/2020 Lazovich ............... G06N 3/084
(Continued)

FOREIGN PATENT DOCUMENTS

CN 114170099 A * 3/2022 ............. G06N 3/045
WO WO-2019200289 A1 * 10/2019 ........... G06N 3/0675
(Continued)

OTHER PUBLICATIONS

PCT International Preliminary Report on Patentability (Chapter I of the Patent Cooperation Treaty) for PCT/US2023/066929; Applicant: The Regents of the University of California, Form PCT/IB/326 and 373, dated Dec. 5, 2024 (13 pages).
(Continued)

*Primary Examiner* — Anthony J Daniels
(74) *Attorney, Agent, or Firm* — VISTA IP LAW GROUP LLP

(57) ABSTRACT

A diffractive camera performs class-specific imaging of target objects with instantaneous all-optical erasure of other classes of objects. This diffractive camera includes transmissive surfaces structured using deep learning to perform selective imaging of target classes of objects positioned at its input field-of-view. After fabrication, the substrate layers collectively perform optical mode filtering to accurately form images of the objects that belong to a target data class or group of classes, while instantaneously erasing objects of the other data classes at the output field-of-view. In another
(Continued)

embodiment, a class-specific permutation camera is disclosed where objects of a target data class are pixel-wise permuted for all-optical class-specific encryption, while the other objects are irreversibly erased from the output image. The diffractive camera can be scaled to different parts of the electromagnetic spectrum to provide transformative opportunities for privacy-preserving digital cameras and task-specific data-efficient imaging.

27 Claims, 16 Drawing Sheets

(51) Int. Cl.
*G06T 3/04* (2024.01)
*G06V 10/82* (2022.01)

(58) Field of Classification Search
USPC .................................................... 348/207.99
See application file for complete search history.

(56) References Cited

U.S. PATENT DOCUMENTS

| | | | |
|---|---|---|---|
| 11,392,830 B2 | 7/2022 | Ozcan et al. | |
| 11,694,082 B2 | 7/2023 | Ozcan et al. | |
| 11,734,555 B2 * | 8/2023 | Shen | G06N 3/0675 706/19 |
| 11,797,836 B1 * | 10/2023 | Evans | G01S 17/931 |
| 12,086,717 B2 | 9/2024 | Ozcan et al. | |
| 2017/0351293 A1 * | 12/2017 | Carolan | G02F 1/225 |
| 2018/0158175 A1 | 6/2018 | Shmunk et al. | |
| 2020/0372660 A1 | 11/2020 | Li et al. | |
| 2021/0027154 A1 * | 1/2021 | Zalevsky | G06N 3/067 |
| 2021/0097378 A1 | 4/2021 | Rodrigues et al. | |
| 2021/0142170 A1 | 5/2021 | Ozcan et al. | |
| 2021/0203886 A1 * | 7/2021 | Byrne | G06N 3/0464 |
| 2022/0114711 A1 | 4/2022 | Ozcan et al. | |
| 2022/0253685 A1 | 8/2022 | Ozcan et al. | |
| 2022/0327371 A1 | 10/2022 | Ozcan et al. | |
| 2022/0366253 A1 | 11/2022 | Ozcan et al. | |
| 2023/0024787 A1 | 1/2023 | Ozcan et al. | |
| 2023/0153600 A1 | 5/2023 | Ozcan et al. | |
| 2023/0162016 A1 | 5/2023 | Ozcan et al. | |
| 2023/0251189 A1 | 8/2023 | Ozcan et al. | |
| 2023/0368012 A1 * | 11/2023 | Yu | G02B 5/18 |
| 2023/0401436 A1 | 12/2023 | Ozcan et al. | |
| 2023/0401447 A1 | 12/2023 | Ozcan et al. | |
| 2024/0288701 A1 | 8/2024 | Ozcan et al. | |

FOREIGN PATENT DOCUMENTS

| | | |
|---|---|---|
| WO | WO 2020/247828 A1 | 12/2020 |
| WO | WO 2021/050550 A1 | 3/2021 |
| WO | WO 2021/231139 A1 | 11/2021 |
| WO | WO 2021/237170 A1 | 11/2021 |
| WO | WO 2022/006018 A1 | 1/2022 |
| WO | WO 2022/056422 A1 | 3/2022 |
| WO | WO 2022/087345 A1 | 4/2022 |
| WO | WO 2023/287586 A1 | 1/2023 |
| WO | WO 2023/141403 A1 | 7/2023 |
| WO | WO 2023/183859 A2 | 9/2023 |
| WO | WO 2023/230412 A1 | 11/2023 |
| WO | WO 2023/244949 A1 | 12/2023 |
| WO | WO 2024/123506 A1 | 6/2024 |
| WO | WO 2024/155325 A2 | 7/2024 |
| WO | WO 2024/191523 A2 | 9/2024 |
| WO | WO 2024/196520 A1 | 9/2024 |

OTHER PUBLICATIONS

PCT International Search Report and Written Opinion dated Sep. 27, 2024 for PCT/US2023/066929, (14 pages).

Ankur Chattopadhyay et al., PrivacyCam: a Privacy Preserving Camera Using uCLinux on the Blackfin DSP, Conference Paper in Proceedings / CVPR, IEEE Computer Society Conference on Computer Vision and Pattern Recognition, IEEE Computer Society Conference on Computer Vision and Pattern Recognition (Jun. 2007); https://www.researchgate.net/publication/221363538; doi:10.1109/CVPR_2007.383413.

Diederik P. Kingma et al., Adam: A Method for Stochastic Optimization, published as a conference paper at ICLR 2015, arXiv:1412.6980v9 [cs.LG] Jan. 30, 2017.

Xing Lin et al., Title: All-Optical Machine Learning Using Diffractive Deep Neural Networks, (2018) (20 pages).

Yi Luo et al., Design of task-specific optical systems using broadband diffractive neural networks, Light: Science & Applications (2019) 8:112, https://doi.org/10.1038/s41377-019-0223-1.

Deniz Mengu et al., Misalignment resilient diffractive optical networks, Nanophotonics (2020), 9(13):4207-4219.

P.J. Narayanan Mrityunjay, The De-Identification Camera, 2011 Third National Conference on Computer Vision, Pattern Recognition, Image Processing and Graphics (4 pages).

Francesco Pittaluga et al., Privacy Preserving Optics for Miniature Vision Sensors, IEEE Xplore (2015).

Francesco Pittaluga et al., Sensor-level Privacy for Thermal Cameras, (2016).

Thomas Winkler et al., TrustCAM: Security and Privacy-Protection for an Embedded Smart Camera based on Trusted Computing, 2010 Seventh IEEE International Conference on Advanced Video and Signal Based Surveillance; DOI 10.1109/AVSS.2010.38.

* cited by examiner

CLASS-SPECIFIC DIFFRACTIVE CAMERA WITH ALL-OPTICAL ERASURE OF UNDESIRED OBJECTS

RELATED APPLICATION

This Application is a U.S. National Stage filing under 35 U.S.C. § 371 of International Application No. PCT/US2023/066929, filed on May 12, 2023, which claims priority to U.S. Provisional Patent Application No. 63/345,416 filed on May 24, 2022, which are hereby incorporated by reference. Priority is claimed pursuant to 35 U.S.C. §§ 119, 371 and any other applicable statute.

STATEMENT REGARDING FEDERALLY SPONSORED RESEARCH AND DEVELOPMENT

This invention was made with government support under Grant Number N00014-22-1-2016, awarded by the U.S. Navy, Office of Naval Research. The government has certain rights in the invention.

TECHNICAL FIELD

The technical field relates to an optical deep learning physical architecture or platform that can perform, at the speed of light, various complex functions. In particular, the technical field relates to a camera that incorporates an optical neural network that captures images of target classes of objects yet erases and/or distorts images of non-target classes of objects.

BACKGROUND

Digital cameras and computer vision techniques are ubiquitous in modern society. Over the past few decades, computer vision-assisted applications have been adapted massively in a wide range of fields, such as video surveillance, autonomous driving assistance, medical imaging, facial recognition, and body motion tracking. With the comprehensive deployment of digital cameras in workspaces and public areas, a growing concern for privacy has emerged due to the tremendous amount of image data being collected continuously. Some commonly used methods address this concern by applying post-processing algorithms to conceal sensitive information from the acquired images. Following the computer vision-aided detection of the sensitive content, traditional image redaction algorithms, such as image blurring, encryption, and image inpainting are performed to secure private information such as human faces, plate numbers, or background objects. In recent years, deep learning techniques have further strengthened these algorithmic privacy preservation methods in terms of their robustness and speed. Despite the success of these software-based privacy protection techniques, there exists an intrinsic risk of raw data exposure given the fact that the subsequent image processing is executed after the raw data recording/digitization and transmission, especially when the required digital processing is performed on a remote device, e.g., a cloud-based server.

Another set of solutions to such privacy concerns can be implemented at the hardware/board level, in which the data processing happens right after the digital quantization of an image, but before its transmission. Such solutions protect privacy by performing in-situ image modifications using camera-integrated online processing modules. For instance, by embedding a digital signal processor (DSP) or Trusted Platform Module (TPM) into a smart camera, the sensitive information can be encrypted or deidentified. These camera integration solutions provide an additional layer of protection against potential attacks during the data transmission stage; however, they do not completely resolve privacy concerns as the original information is already captured digitally, and adversarial attacks can happen right after the camera's digital quantization.

Implementing these image redaction algorithms or embedded DSPs for privacy protection also creates some undesirable environmental impacts. For example, to support the computation/processing of massive amounts of visual data being generated every day, i.e., billions of images and millions of hours of videos, the demand for digital computing power and data storage space rapidly increases, posing a major challenge for sustainability.

Intervening into the light propagation and image formation stage and passively enforcing privacy before the image digitization can potentially provide more desired solutions to both of these challenges outlined earlier. For example, some of the existing works use customized optics or sensor read-out circuits to modify the image formation models, so that the sensor only captures low-resolution images of the scene and, therefore, the identifying information can be concealed. Such methods sacrifice the image quality of the entire sample field-of-view (FOV) for privacy preservation, and therefore, a delicate balance between the final image quality and privacy preservation exists; a change in this balance for different objects can jeopardize imaging performance or privacy. Furthermore, degrading the image quality of the entire FOV limits the applicable downstream tasks to low-resolution operations such as human pose estimation. In fact, sacrificing the entire image quality can be unacceptable under some circumstances such as e.g., in autonomous driving. Additionally, since these methods establish a blurred or low-resolution pixel-to-pixel mapping between the input scene and the output image, the original information of the samples can be potentially retrieved via digital inverse models, using e.g., blind image deconvolution or estimation of the inherent point-spread function.

SUMMARY

Here, a new camera is disclosed that uses diffractive computing, which images the target types/classes of objects with high fidelity, while all-optically and instantaneously erasing other types of objects at its output. This computational camera processes the optical modes that carry the sample information using successive diffractive layers optimized through deep learning by minimizing a training loss function customized for class-specific imaging. After the training phase, these diffractive layers are fabricated and assembled together in 3D, forming a computational imager between an input FOV and an output plane. This camera design is not based on a standard point-spread function, and instead the 3D-assembled diffractive layers collectively act as an optical mode filter that is statistically optimized to pass through the major modes of the target classes of objects, while filtering and scattering out the major representative modes of the other classes of objects (learned through the data-driven training process). As a result, when input objects from the target classes pass through the diffractive camera (e.g., transmitted or reflected light from objects), clear images form at the output plane, while the other classes of input objects are all-optically erased, forming non-informative patterns similar to background noise, with lower light intensity. Since all the spatial information of non-target object classes is instantaneously erased through light diffraction within a thin diffractive volume, their direct or low-resolution images are never recorded at the image plane, and this feature can be used to reduce the image storage and transmission load of the camera. Except for the illumination light, this object class-specific camera design does not utilize external computing power and is entirely based on passive transmissive layers, providing a highly power-efficient solution to task-specific and privacy-preserving imaging.

The success of this new class-specific camera design was experimentally demonstrated using THz radiation and 3D-printed diffractive layers that were assembled together to specifically and selectively image only one data class of the MNIST handwritten digit database, while all-optically rejecting the images of all the other handwritten digits at its output FOV. Despite the random variations observed in handwritten digits (from human to human), the analysis revealed that any arbitrary handwritten digit/class or group of digits could be selected as the target, preserving the same all-optical rejection/erasure capability for the remaining classes of handwritten digits. Class-specific imaging of input FOVs with multiple objects simultaneously present was also demonstrated, where only the objects that belong to the target class were imaged at the output plane, while the rest were all-optically erased. Apart from direct imaging of the target objects from specific data classes, it was further demonstrated that this diffractive imaging framework can be used to design class-specific permutation cameras that output pixel-wise permuted images of the target class of objects, while all-optically erasing other types of objects at the output FOV. The diffractive camera design can inspire future imaging systems that consume orders of magnitude less computing and transmission power as well as less data storage, helping with the global need for task-specific, data-efficient and privacy-aware modern imaging systems.

In one embodiment, a diffractive camera is disclosed that captures images containing one or more target classes of objects while all-optically erasing and/or distorting one or more non-target classes of objects. The diffractive camera includes a diffractive network that receives one or more input images or input optical fields at an input field-of-view, the diffractive network including one or more optically transmissive and/or reflective substrate layers arranged in an optical path, each of the one or more optically transmissive and/or reflective substrate layers having a plurality of physical features formed on or within the one or more optically transmissive or reflective substrate layers and having different transmission and/or reflection properties as a function of the lateral coordinates across each substrate layer, wherein the one or more optically transmissive and/or reflective substrate layers and the plurality of physical features thereon collectively generate an output image that includes the one or more target classes of objects from the input images or input optical fields and substantially erases and/or distorts the one or more non-target classes of objects from the input images or input optical fields. The camera, in one embodiment, includes one or more optical image sensors or a plurality of photodetectors configured to capture the output image resulting from the one or more optically transmissive and/or reflective substrate layers.

In another embodiment, a diffractive network is disclosed that receives an input optical field or image containing target and/or non-target class(es) of one or more objects at an input field-of-view, the diffractive network including one or more optically transmissive and/or reflective substrate layers arranged in an optical path, each of the one or more optically transmissive and/or reflective substrate layers including a plurality of physical features formed on or within the one or more optically transmissive or reflective substrate layers and having different transmission and/or reflection properties as a function of the lateral coordinates across each substrate layer, wherein the one or more optically transmissive and/or reflective substrate layers and the plurality of physical features thereon collectively generate an output optical field or image that includes the target class(es) of the one or more objects from the input image or input optical field and substantially erases and/or distorts the non-target class(es) of the one or more objects from the input image or input optical field.

In another embodiment, a diffractive camera is disclosed that captures linearly transformed images containing one or more target classes of objects while all-optically erasing and/or distorting the optical signals corresponding to one or more non-target classes of objects. The diffractive camera includes a diffractive network that receives one or more input images or input optical fields at an input field-of-view, the diffractive network having one or more optically transmissive and/or reflective substrate layers arranged in an optical path, each of the one or more optically transmissive and/or reflective substrate layers having a plurality of physical features formed on or within the one or more optically transmissive or reflective substrate layers and having different transmission and/or reflection properties as a function of the lateral coordinates across each substrate layer, wherein the one or more optically transmissive and/or reflective substrate layers and the plurality of physical features thereon collectively generate a linear transformation between pixels of the input images or input optical fields at the input field-of-view an output image including pixels of an output field of view. The camera further includes one or more optical image sensors or a plurality of photodetectors configured to capture a linearly transformed output image containing one or more target classes of objects while all-optically erasing and/or distorting the signals corresponding to the one or more non-target classes of objects resulting from the one or more optically transmissive and/or reflective substrate layers.

In another embodiment, a method of generating linearly transformed images containing one or more target classes of objects while all-optically erasing and/or distorting the optical signals corresponding to one or more non-target classes of objects is disclosed. The method includes providing a diffractive network that receives one or more input images or input optical fields at an input field-of-view, the diffractive network including one or more optically transmissive and/or reflective substrate layers arranged in an optical path, each of the one or more optically transmissive and/or reflective substrate layers having a plurality of physical features formed on or within the one or more optically transmissive or reflective substrate layers and having different transmission and/or reflection properties as a function of the lateral coordinates across each substrate layer, wherein the one or more optically transmissive and/or reflective substrate layers and the plurality of physical features thereon collectively generate a linear transformation between pixels of the input images or input optical fields at the input field-of-view and an output image including pixels of an output field of view.

BRIEF DESCRIPTION OF THE DRAWINGS

FIG. 17A shows diffractive layers for the three-layer diffractive camera design. FIG. 17B shows diffractive layers for the four-layer diffractive camera design. FIG. 17C shows diffractive layers for the five-layer diffractive camera design.

DETAILED DESCRIPTION OF ILLUSTRATED EMBODIMENTS

Figure 1:
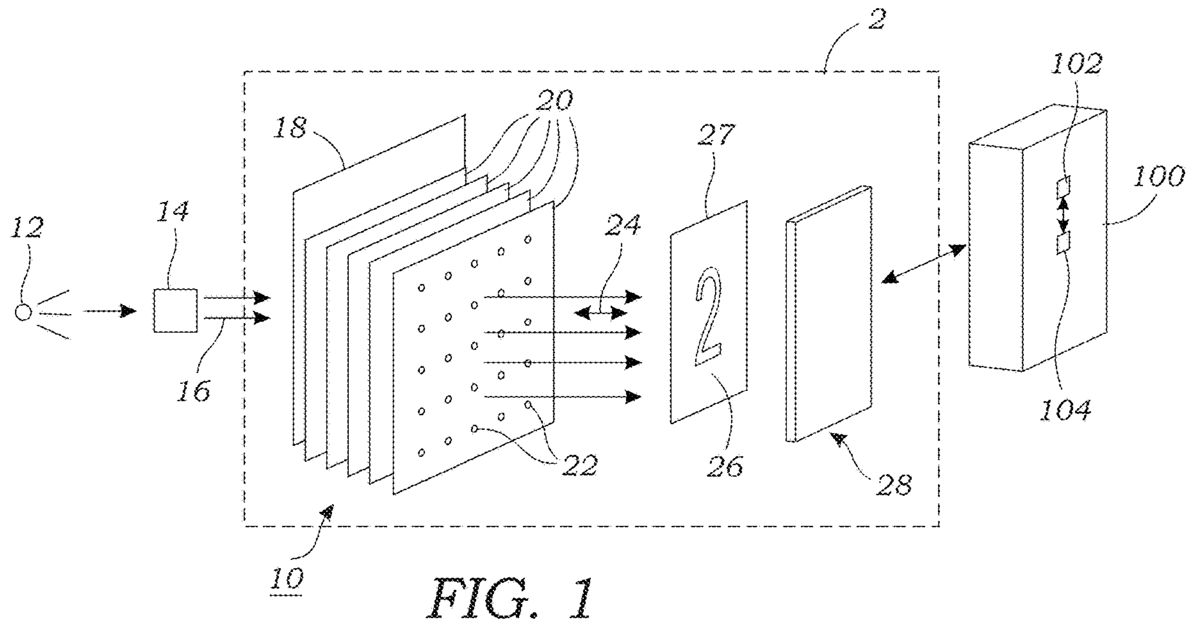
FIG. 1 schematically illustrates one embodiment of a camera that includes a diffractive network that is used in transmission mode according to one embodiment. A source of light directs light on or through an object (or multiple objects) and into the diffractive network (or an optical signal). In this mode, light passes through the individual substrate layers that form the diffractive network. The light that passes through the diffractive network forms an output optical field or image that is/are detected by one or more optical sensors. The diffractive network generates a linearly transformed output image containing one or more target classes of objects while all-optically erasing and/or distorting the signals corresponding to the one or more non-target classes of objects.

FIG. 1 schematically illustrates one embodiment of a diffractive camera 2 that includes a diffractive network 10 that is used in transmission mode according to one embodiment. A light source 12 directs light onto an object 14 (either transmission mode or reflection mode as explained herein in more detail) and the optical field or image 16 from the object 14 is input into the diffractive camera 2 that contains the diffractive network 10. The diffractive network includes one or more substrate layers 20 (also sometimes referred to herein as diffractive layers). As explained herein, in one preferred embodiment, there are a plurality of substrate layers 20 used in the diffractive network 10. However, in other embodiments, only a single substrate layer 20 may be used. As explained herein, there is often a tradeoff in network performance based on the number of substrate layers 20. However, in certain embodiments, only a single substrate layer 20 may produce acceptable results. The optical field generated from the transmitted and/or reflected light from the object(s) 14 creates an input optical field or image 16 to the diffractive network 10 at an input field-of-view or input plane 18. The input field-of-view 18 defines the area or region of a scene or image captured by the diffractive network 10.

The diffractive network 10 contains one or more substrate layers 20 that are physical layers which may be formed as a physical substrate or matrix of optically transmissive material (for transmission mode) or optically reflective material (for reflective mode one). In transmission mode light or radiation passes through the substrate layer(s) 20. Conversely, in reflective mode, light or radiation reflects off the substrate layer(s) 20. Exemplary materials that may be used for the substrate layers 20 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same. Metal coated materials may be used for reflective substrate layers 20. Light may emit directly from a light source 12 and proceed directly into the diffractive network 10. The light may encode the optical field or optical image 16 directly. Alternatively, light from the light source 12 may pass through and/or reflect off an object 14, medium, or the like prior entering the diffractive network 10. When a light source 12 is used as part of the diffractive network 10, the light source 12 may be artificial (e.g., light bulb, laser, light emitting diodes, laser diodes, etc.) or the light source 12 may include natural light such as sunlight.

Figure 2:
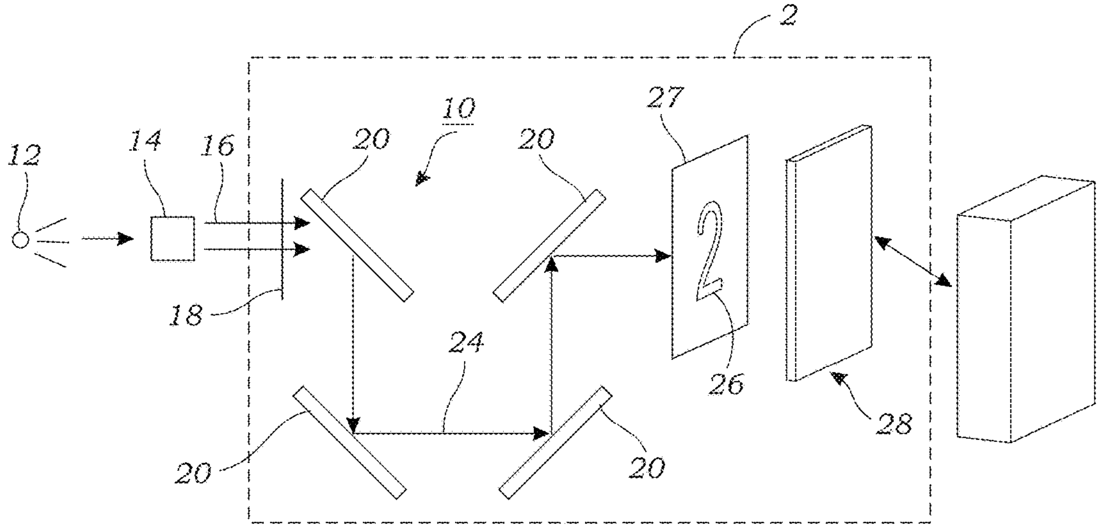
FIG. 2 schematically illustrates another embodiment of a diffractive network that is used in reflection mode according to one embodiment. In this mode, light reflects off the individual substrate layers that form the diffractive network. The reflected light from the diffractive network forms an output optical field or image that is/are detected by one or more optical sensors. The diffractive network generates a linearly transformed output image containing one or more target classes of objects while all-optically erasing and/or distorting the signals corresponding to the one or more non-target classes of objects.

With reference to FIGS. 3-6, each substrate layer 20 of the diffractive network 10 has a plurality of physical features 22 formed on the surface of the substrate layer 20 or within the substrate layer 20 itself that collectively define a pattern of physical locations along the length and width of each substrate layer 20 that have varied transmission properties (or varied reflection properties for the embodiment of FIG. 2). The physical features 22 formed on or in the substrate layers 20 thus create a pattern of physical locations within the substrate layers 20 that have different valued transmission and/or reflective properties as a function of lateral coordinates (e.g., length and width and in some embodiments depth) across each substrate layer 20. In some embodiments, each separate physical feature 22 may define a discrete physical location on the substrate layer 20 while in other embodiments, multiple physical features 22 may combine or collectively define a physical region with a particular transmission (or reflection) property. The one or more substrate layers 20 arranged along the optical path 24 (FIG. 1) collectively generate an output field or image 26 at an output field-of-view or output plane 27 that includes the one or more target classes of objects 14 and substantially erases and/or distorts the one or more non-target classes of objects 14.

For example, consider a document that contains personally identifiable information like a social security number. The document may include text, images, and numbers which are effectively different objects 14 within the document. If a traditional camera or scanner were used to take a photograph of the document, the social security number (the non-target class of object in this example) would be present in the output image. Here, as one illustrative example, the camera 2 is designed to substantially erase and/or distort the social security number in the output image 26. The diffractive network 10 is trained to erase or obscure numbers or numbers that appear in a particular sequence or format. The camera 2 described herein is able to output a substantially faithful image of the document that substantially erases and/or distorts the social security number. It should be appreciated that this is just one example of the use of the camera 2 described herein.

Figure 13A:
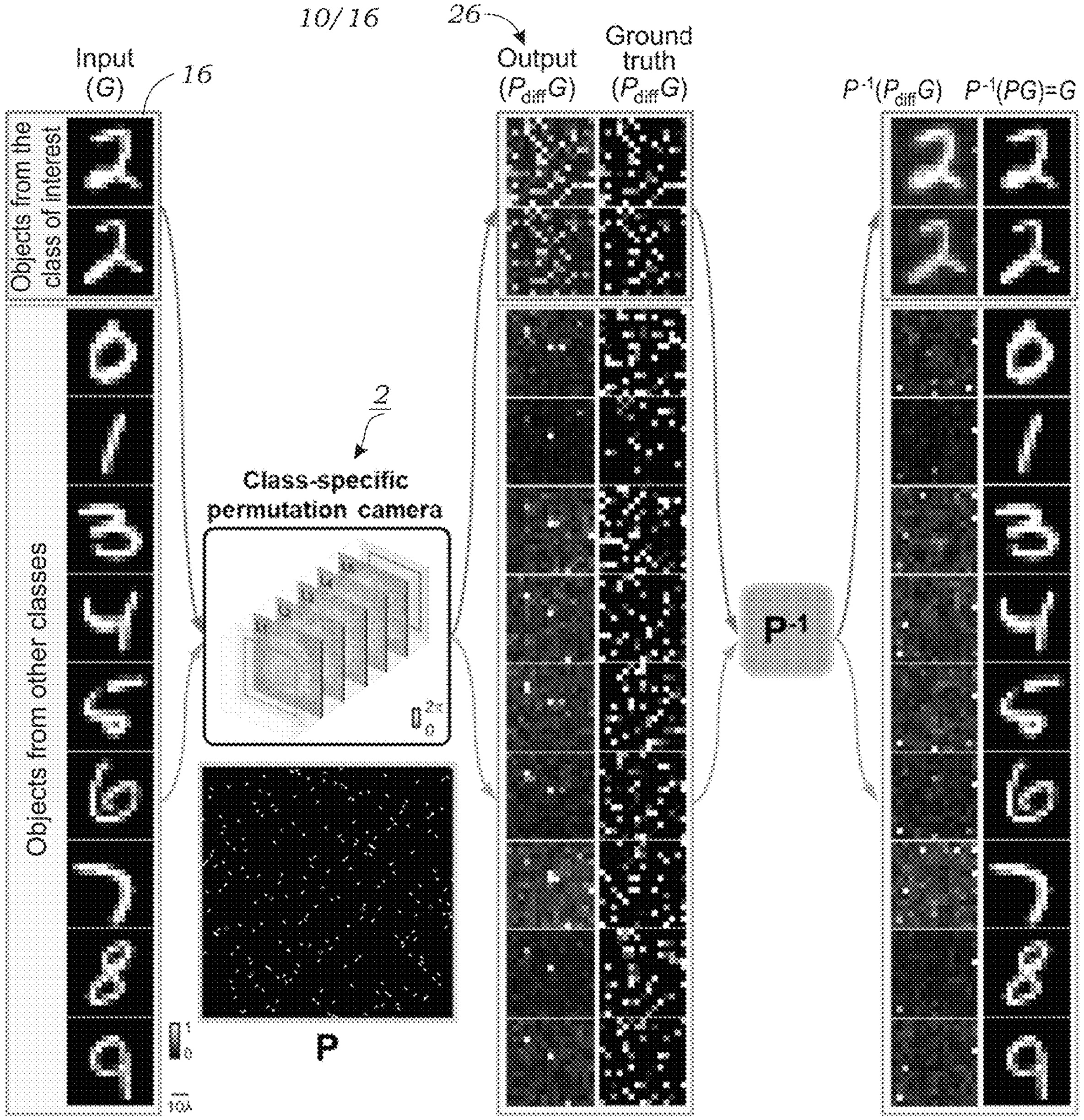
FIG. 13A schematically illustrates operation of a five-layer diffractive camera trained to perform class-specific permutation operation (denoted as P) with instantaneous all-optical erasure of the other classes of objects at its output FOV. Application of an inverse permutation ($P^{-}$) to the output images recovers the original objects of the target data class, whereas the rest of the objects from other data classes are irreversibly lost/erased at the output FOV. The output images were normalized using the same constant for visualization.
Figure 13B:
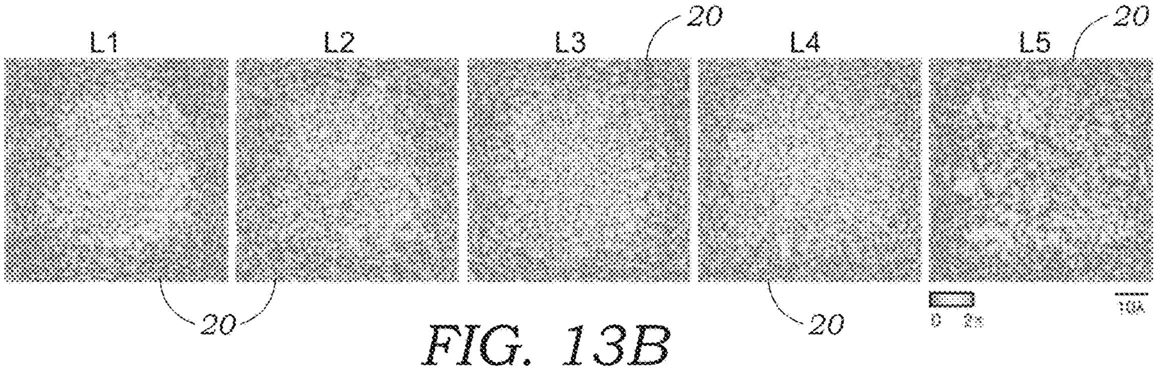
FIG. 13B illustrates phase modulation patterns of the converged diffractive layers of the class-specific permutation camera.

In other embodiments, such as in the embodiment of FIGS. 13A-13B, the output field or image 26 that is generated is linearly transformed between the pixels of the input images or input optical fields 16 at the input field-of-view and the pixels of the output field or image 26 at the output field-of-view. A computing device 100 that runs image processing software 102 can then recover the final output image of one or more target classes of objects 14 using an inverse linear transformation that is applied to the linearly transformed output image. The inverse linear transformation may also be applied to the interim image using hardware or a combination of hardware and software. In one particular embodiment, the output of the diffractive network 10 is a pixel-wise permuted output image defined by a linear transformation that defines a one-to-one mapping of each image pixel of the input images or input optical fields 16 at the input field-of-view and the pixels of the output field of view. The permuted output image adds another layer of protection as the linearly transformed image that is generated by the camera 2 does not contain any useful information. Only after application of the inverse linear transformation is the final image generated that includes the one or more target classes of objects 14 and substantially erases and/or distorts the one or more non-target classes of objects 14.

Figure 3:
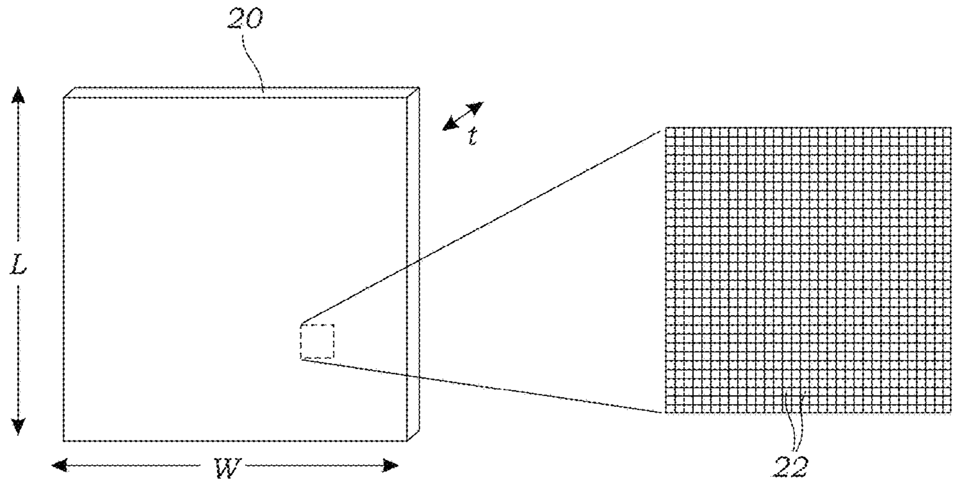
FIG. 3 illustrates a single substrate layer of a diffractive network. The substrate layer may be made from a material that is optically transmissive (for transmission mode such as illustrated in FIG. 1) or an optically reflective material (for reflective mode as illustrated in FIG. 2). The substrate layer, which may be formed as a substrate or plate in some embodiments, has surface features formed across the substrate layer. The surface features form a patterned surface (e.g., an array) having different valued transmission (or reflection) properties as a function of lateral coordinates across each substrate layer. These surface features act as artificial "neurons" that connect to other "neurons" of other substrate layers of the optical neural network through optical diffraction (or reflection) and alter the phase and/or amplitude of the light wave.
Figure 9A:
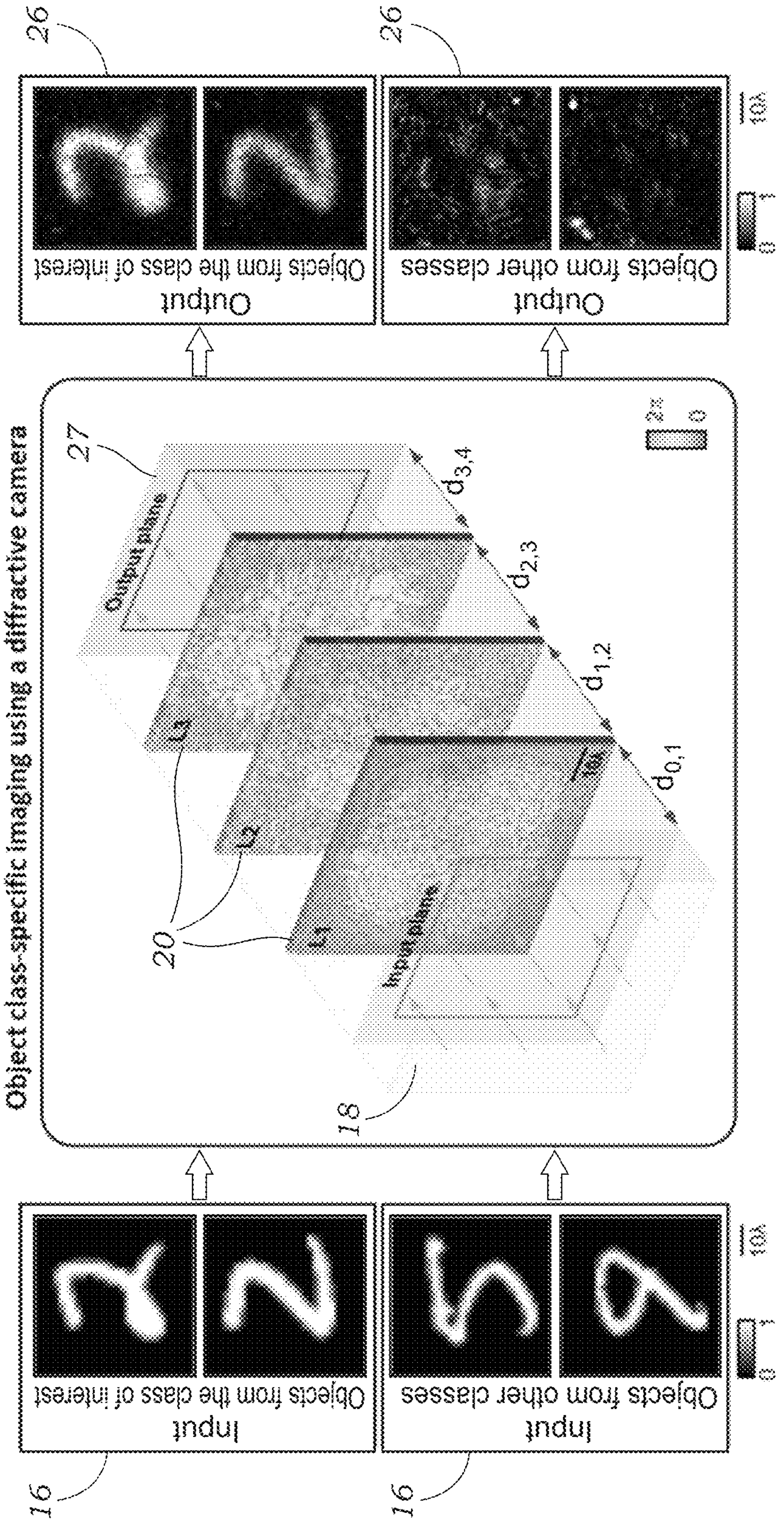
FIG. 9A schematically illustrates a three-layer diffractive camera trained to perform object class-specific imaging with instantaneous all-optical erasure of the other classes of objects at its output FOV. Here, the digit "2" is an object from the target class while other digits are in non-target classes. The camera outputs images of showing the digit "2" but all-optically erases and/or distorts the digits that are outside this target class.
Figure 9B:
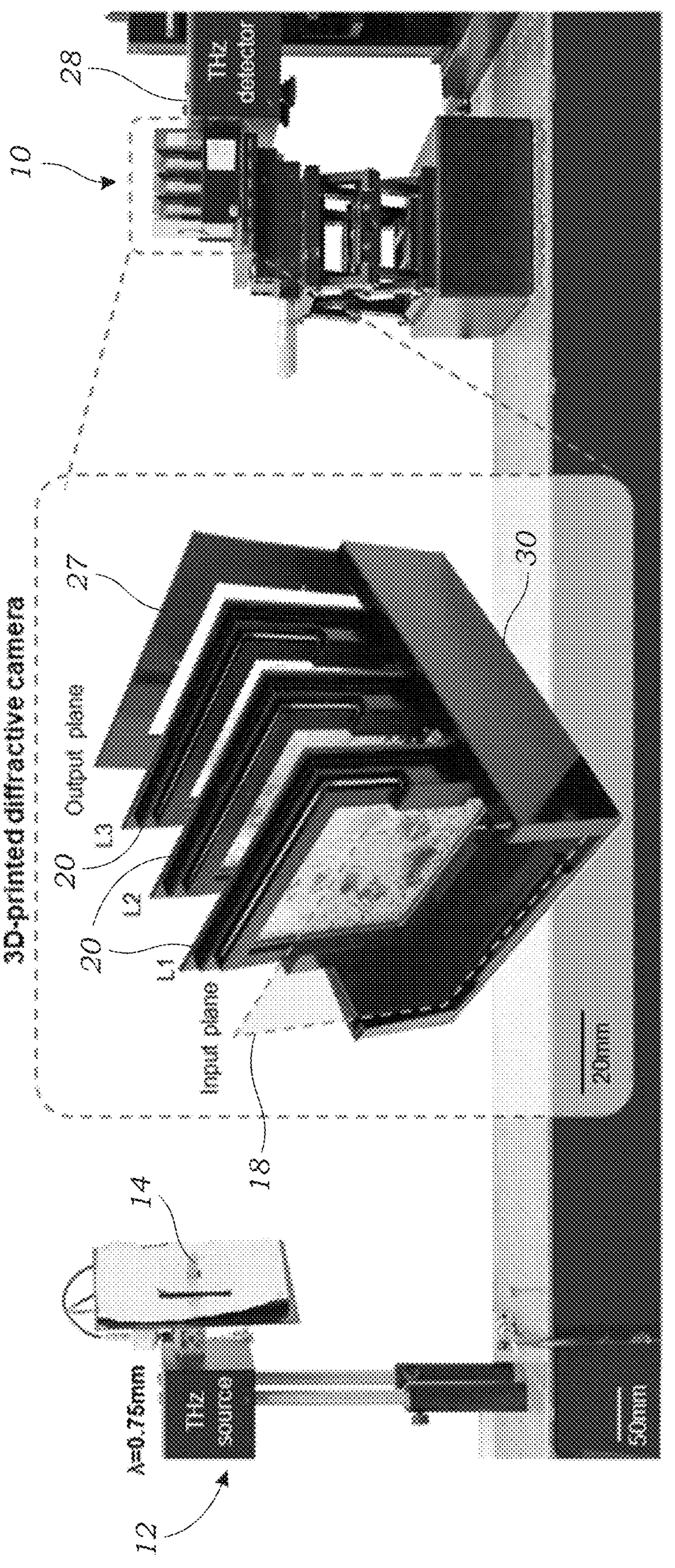
FIG. 9B illustrates the experimental setup for the diffractive camera testing using coherent THz illumination.

The pattern of physical locations formed by the physical features 22 may define, in some embodiments, an array located across the surface of the substrate layer 20. With reference to FIG. 3, the substrate layer 20 in one embodiment is a two-dimensional generally planer substrate having a length (L), width (W), and thickness (t) that all may vary depending on the particular application. In other embodiments, the substrate layer 20 may be non-planer such as, for example, curved. In addition, while FIG. 3 and the experimental embodiment of FIGS. 9A and 9B illustrates a rectangular or square-shaped substrate layers 20 different geometries are contemplated. With reference to FIG. 1 and FIG. 3, the physical features 22 and the physical regions formed thereby act as artificial "neurons" that connect to other "neurons" of other substrate layers 20 of the diffractive network 10 (as seen, for example, in FIGS. 1 and 2) through optical diffraction (or reflection in the case of the embodiment of FIG. 2) and alter the phase and/or amplitude of the light wave. The particular number and density of the physical features 22 or artificial neurons that are formed in each substrate layer 20 may vary depending on the type of application. In some embodiments, the total number of artificial neurons may only need to be in the hundreds or thousands while in other embodiments, hundreds of thousands or millions of neurons or more may be used. Likewise, the number of substrate layers 20 that are used in a particular diffractive network 10 may vary although it typically ranges from at least one substrate layer 20 to less than ten substrate layers 20.

As seen in FIG. 1, in one embodiment, the output optical field or image 26 that is generated at the output field-of-view is/are captured by one or more optical sensors 28 (e.g., detectors). The optical sensor(s) 28 may include, for example, an optical image sensor (e.g., CMOS image sensor or image chip such as CCD), photodetectors (e.g., photodiode such as avalanche photodiode detector (APD)), photomultiplier (PMT) device, and the like. The photodetectors may be arranged in an array in some embodiments. In some embodiments, there are multiple optical sensors 28. These may be discrete optical sensors 28 or they may even be certain pixels on a larger array such as CMOS image sensor that act as individual sensors. The one or more optical sensors 28 may, in some embodiments, be coupled to a computing device 100 as seen in FIGS. 1 and 2 (e.g., a computer or the like such as a personal computer, laptop, server, mobile computing device) that is used to acquire, store, process, manipulate, analyze, and/or transfer the output optical field or image 26 with image processing software 102. In other embodiments, the optical sensor(s) 28 may be integrated within a device such as a diffractive camera 2 that is configured to acquire, store, process, manipulate, analyze, and/or transfer the output optical field or image 26 (the computing functionality may be provided in the camera 2 and a separate computing device 100 may not be needed). In some embodiments, the optical sensor(s) 28 may be associated with an aperture. An opaque layer having one or more apertures (not shown) formed therein may be interposed between the last of the substrate layers 20 and the optical sensor(s) 28.

In some embodiments, the optical sensor 28 (e.g., optical image sensor or photodetectors) may be omitted and the output optical field or image 26 that is generated by the diffractive network is projected onto a surface. The surface that the output optical field or image may include, for example, an eye. The surface may also include a screen or the like on which the output optical field or image 26 is displayed.

FIG. 2 schematically illustrates one embodiment of a diffractive network 10 that is used in reflection mode. Similar components and features shared with the embodiment of FIG. 1 are labeled similarly. In this embodiment, the object(s) 14 is/are illuminated with light from the light source 12 as described previously to generate an input optical image 16. This input object field/image 16 is input to the camera 2 with the diffractive network 10. In this embodiment, the diffractive network 10 operates in reflection mode whereby light is reflected by a plurality of substrate layers 20 (which could also be a single layer 20 in some embodiments). As seen in the embodiment of FIG. 2, the optical path 24 is a folded optical path as a result of the reflections off the plurality of substrate layers 20. The number of substrate layers 20 may vary depending on the particular function or task that is to be performed as noted above. Each substrate layer 20 of the diffractive network 10 has a plurality of physical features 22 formed on the surface of the substrate layer 20 or within the substrate layer 20 itself that collectively define a pattern of physical locations along the length and width of each substrate layer 20 that have varied reflection properties. Like the FIG. 1 embodiment, the output optical field or image 26 at the output field-of-view is captured by one or more optical sensors 28. The one or more optical sensors 28 may be coupled to a computing device 100 as noted or integrated into a device such as a diffractive camera 2.

While FIG. 2 illustrates an embodiment of a diffractive network 10 that functions in reflection mode, it should be appreciated that in other embodiments the diffractive network 10 is a hybrid that includes aspects of a transmission mode of FIG. 1 and the reflection mode of FIG. 2. In this hybrid embodiment, the light from the object image 16 transmits through one or more substrate layers 20 and also reflects off one or more substrate layers 20.

Figure 4:
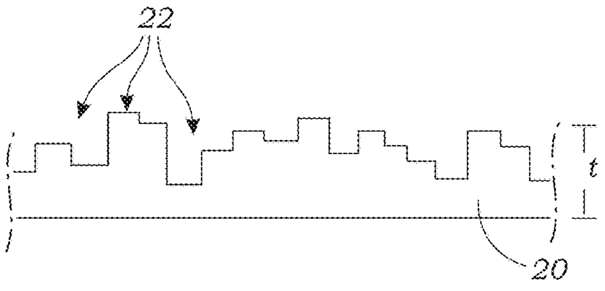
FIG. 4 schematically illustrates a cross-sectional view of a single substrate layer of a diffractive network according to one embodiment. In this embodiment, the surface features are formed by adjusting the thickness of the substrate layer that forms the optical neural network. These different thicknesses may define peaks and valleys in the substrate layer that act as the artificial "neurons."

FIG. 4 illustrates one embodiment of how different physical features 22 are formed in the substrate layer 20. In this embodiment, a substrate layer 20 has different thicknesses (t) of material at different lateral locations along the substrate layer 20. In one embodiment, the different thicknesses (t) modulate the phase of the light passing through the substrate layer 20. This type of physical feature 22 may be used, for instance, in the transmission mode embodiment of FIG. 1. The different thicknesses of material in the substrate layer 20 forms a plurality of discrete "peaks" and "valleys" that control the transmission properties of the neurons formed in the substrate layer 20. The different thicknesses of the substrate layer 20 may be formed using additive manufacturing techniques (e.g., 3D printing) or lithographic methods utilized in semiconductor processing. For example, the design of the substrate layer(s) 20 may be stored in a stereolithographic file format (e.g., .stl file format) which is then used to 3D print the substrate layer(s) 20. Other manufacturing techniques include well-known wet and dry etching processes that can form very small lithographic features on a substrate layer 20. Lithographic methods may be used to form very small and dense physical features 22 on the substrate layer 20 which may be used with shorter wavelengths of the light. As seen in FIG. 4, in this embodiment, the physical features 22 are fixed in permanent state (i.e., the surface profile is established and remains the same once complete).

Figure 5:
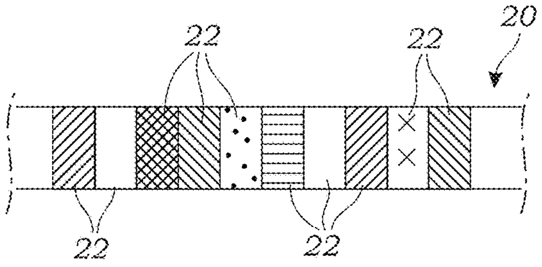
FIG. 5 schematically illustrates a cross-sectional view of a single substrate layer of a diffractive network according to another embodiment. In this embodiment, the different surface features are formed by altering the material composition or material properties of the single substrate layer at different lateral locations across the substrate layer. This may be accomplished by doping the substrate layer with a dopant or incorporating other optical materials into the substrate layer. Metamaterials or plasmonic structures may also be incorporated into the substrate layer.

FIG. 5 illustrates another embodiment in which the physical features 22 are created or formed within the substrate layer 18. In this embodiment, the substrate layer 20 may have a substantially uniform thickness but have different regions of the substrate layer 20 have different optical properties. For example, the refractive (or reflective) index of the substrate layer(s) 20 may be altered by doping the substrate layer(s) 20 with a dopant (e.g., ions or the like) to form the regions of neurons in the substrate layer(s) 20 with controlled transmission properties (and/or absorption and/or spectral features). In still other embodiments, optical nonlinearity can be incorporated into the deep optical network design using various optical non-linear materials (e.g., crystals, polymers, semiconductor materials, doped glasses, polymers, organic materials, semiconductors, graphene, quantum dots, carbon nanotubes, and the like) that are incorporated into the substrate layer 20. A masking layer or coating that partially transmits or partially blocks light in different lateral locations on the substrate layer 20 may also be used to form the neurons on the substrate layer(s) 20.

Alternatively, the transmission function of the physical features 22 or neurons can also be engineered by using metamaterial, and/or metasurfaces (e.g., surfaces with sub-wavelength, nano-scale structures which lead to special optical properties), and/or plasmonic structures. Combinations of all these techniques may also be used. In other embodiments, non-passive components may be incorporated in into the substrate layer(s) 20 such as spatial light modulators (SLMs). SLMs are devices that impose spatial varying modulation of the phase, amplitude, or polarization of light. SLMs may include optically addressed SLMs and electrically addressed SLM. Electric SLMs include liquid crystal-based technologies that are switched by using thin-film transistors (for transmission applications) or silicon backplanes (for reflective applications). Another example of an electric SLM includes magneto-optic devices that use pixelated crystals of aluminum garnet switched by an array of magnetic coils using the magneto-optical effect. Additional electronic SLMs include devices that use nanofabricated deformable or moveable mirrors that are electrostatically controlled to selectively deflect light.

Figure 6:
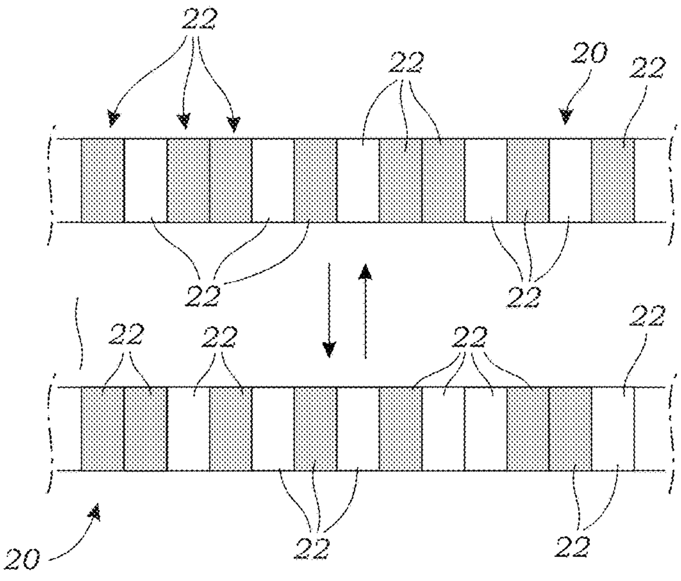
FIG. 6 schematically illustrates a cross-sectional view of a single substrate layer of a diffractive network according to another embodiment. In this embodiment, the substrate layer is reconfigurable in that the optical properties of the various artificial neurons may be changed, for example, by application of a stimulus (e.g., electrical current or field). An example includes spatial light modulators (SLMs) which can change their optical properties. In this embodiment, the neuronal structure is not fixed and can be dynamically changed or tuned as appropriate. This embodiment, for example, can provide a learning optical neural network or a changeable optical neural network that can be altered on-the-fly (e.g., over time) to improve the performance, compensate for aberrations, or even change another task.

FIG. 6 schematically illustrates a cross-sectional view of a single substrate layer 20 of a diffractive network 10 according to another embodiment. In this embodiment, the substrate layer 20 is reconfigurable as a function of time in that the optical properties of the various physical features 22 that form the artificial neurons may be changed, for example, by application of a stimulus (e.g., electrical current or field). An example includes spatial light modulators (SLMs) discussed above which can change their optical properties. The substrate layers(s) 20 may incorporate at least one nonlinear optical material. In other embodiments, the layers may use the DC electro-optic effect to introduce optical nonlinearity into the substrate layer(s) 20 of a diffractive network 10 and require a DC electric-field for each substrate layer 20 of the diffractive network 10. This electric-field (or electric current) can be externally applied to each substrate layer 20 of the diffractive network 10. Alternatively, one can also use poled materials with very strong built-in electric fields as part of the material (e.g., poled crystals or glasses). In this embodiment, the neuronal structure is not fixed and can be dynamically changed or tuned as appropriate (i.e., changed on demand). This embodiment, for example, can provide a learning diffractive network 10 or a changeable diffractive network 10 that can be altered on-the-fly to capture/reject different object classes, improve the performance, compensate for aberrations, or even change another task.

The camera 2 incorporating the diffractive network 10 described herein is used to allow the capture or acquisition of target objects 14 while at the same time rejecting or erasing non-target objects 14. Each input object image 16 may contain one object 14 or multiple objects 14 as described herein. The objects may be from a single class of objects 14 or multiple classes of objects 14. For example, the input object image 16 may include a number of target objects 14 and a number of non-target objects 14.

Figure 7:
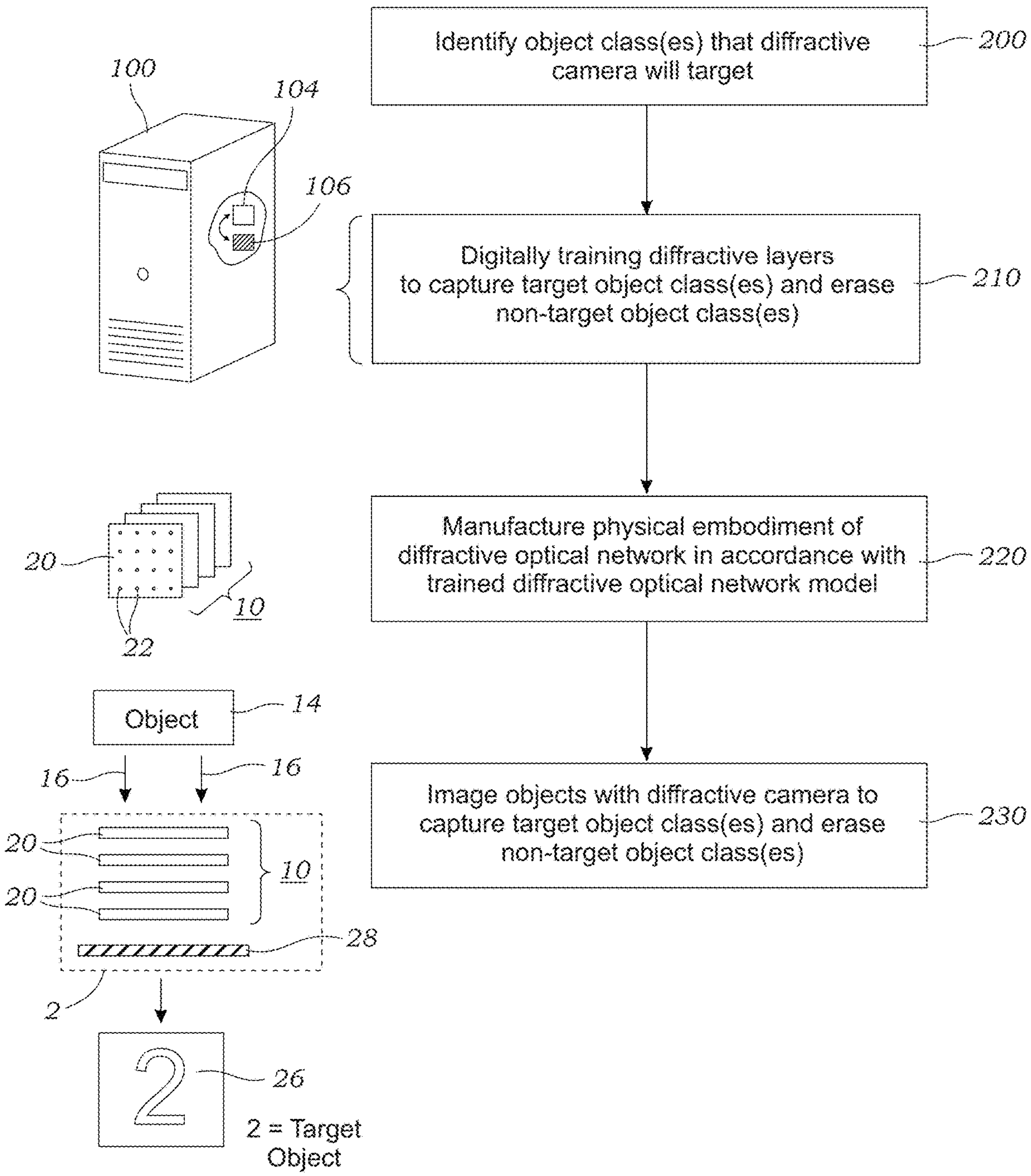
FIG. 7 illustrates a flowchart of the operations according to one embodiment to create and use the diffractive camera.

FIG. 7 illustrates a flowchart of the operations or processes according to one embodiment to create and use the camera 2 of the type disclosed herein. As seen in operation 200 of FIG. 7, the object class(es) that the camera 2 will target (i.e., keep) are identified. Once the target object class(es) have been established, a computing device 100 having one or more processors 104 executes software 106 to then digitally train a model or mathematical representation of single or multi-layer diffractive and/or reflective substrate layers 20 used within the diffractive network 10 to the desired task or function. This digital training operation is illustrated as operation 210 in FIG. 7. This training establishes the particular transmission/reflection properties of the physical features 22 and/or neurons formed in the substrate layer(s) 20 to accomplish the desired task or function. Here, the diffractive network 10 is trained to capture target object class(es) and substantially erase and/or distort the one or more non-target object class(es). Next, using the established model and design for the physical embodiment of the diffractive network 10, the actual substrate layer(s) 20 used in the physical diffractive network 10 are then manufactured in accordance with the model or design (operation 220). The design, in some embodiments, may be embodied in a software format (e.g., SolidWorks, AutoCAD, Inventor, or other computer-aided design (CAD) program or lithographic software program) and may then be manufactured into a physical embodiment that includes the one or more substrate layers 20 having the tailored physical features 22 formed therein/thereon. The physical substrate layer(s) 20, once manufactured may be mounted or disposed in a holder 30 such as that illustrated in FIG. 8. The holder 30 may include a number of slots 32 formed therein to hold the individual substrate layer(s) 20 in the required sequence and with the required spacing between adjacent layers (if needed). The holder 30 or something similar may be integrated into a diffractive camera 2 to hold the substrate layer(s) 30. For example, the diffractive network 10 may be contained in the optical path of a camera 2 and located within the housing of the camera 2. While a camera 2 is principally described herein as containing the diffractive network 10, it should be appreciated that the diffractive network 10 may be included in other portable electronic devices. An example of such a portable electronic device includes goggles. Once the physical embodiment of the diffractive network 10 has been made, the diffractive network 10 is then used to image objects 14 to capture target object classes and substantially erase and/or distort non-target object classes as illustrated in operation 230 of FIG. 7. In this example, the target object class is a number belonging to the “2” digit class. The camera 2 may be used to image objects 14 and generate individual images or the camera 2 may be used to generate a plurality of images as such as a video.

Figure 8:
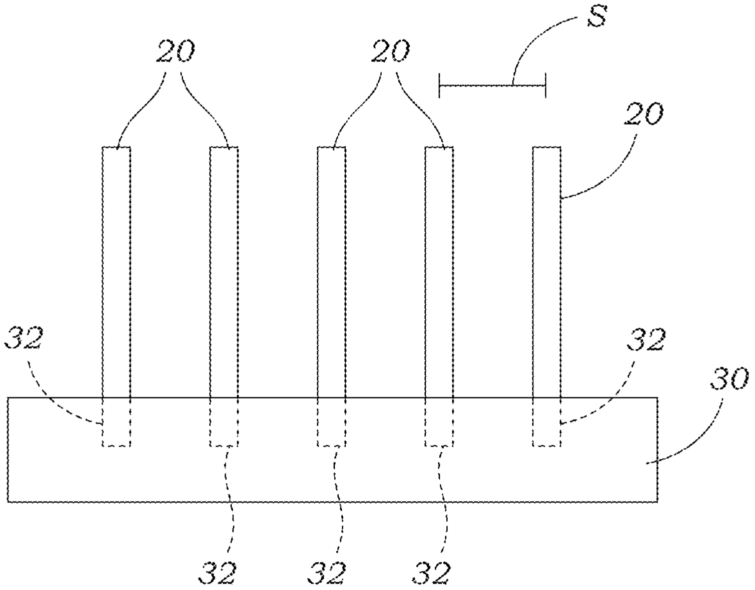
FIG. 8 illustrates an embodiment of a holder that is used to secure the substrate layers used in a diffractive camera.

As noted above, the particular spacing of the substrates 20 that make the diffractive network 10 may be maintained using the holder 30 of FIG. 8 or a similar substrate holder inside the camera 2. The holder 30 may contact one or more peripheral surfaces of the substrate layer(s) 20. In some embodiments, the holder 30 may contain a number of slots 32 that provide the ability of the user to adjust the spacing (S) between adjacent substrate layers 20. In some embodiments, the substrate layers 20 may be permanently secured to the holder 30 while in other embodiments, the substrate layers 20 may be removable from the holder 30. The one or more substrate layers 20 may be positioned within and/or surrounded by vacuum, air, a gas, a liquid, or a solid material. The diffractive network 10 is preferably vaccinated during the training phase to accommodate potential misalignments. For example, the physical diffractive network 10 may be used in an application where physical forces are present that could result in object or signal transformations. Environmental conditions may also create object transformations. The physical diffractive network 10 is able to tolerate these transformations without sacrificing performance of the physical diffractive network 10.

While the camera 2 and the diffractive network 10 have been largely described herein as capturing target objects 14 belonging to a particular class or classes and substantially erase and/or distort the one or more non-target object class(es), it should be appreciated that the diffractive network 10 may be trained to operate in an opposing mode where target objects 14 are substantially erased and/or distorted the one or more non-target object class(es) are transmitted through the diffractive network 10 and captured. For example, consider using the camera 2 to obtain an image of an outdoor dining scene and it is desirable to hide or blur images of people's faces. The diffractive network 10 may be trained to hide or blur faces (i.e., targets in this implementation) while not blocking the other photographic elements in the scene.

EXPERIMENTAL

Results

Class-Specific Imaging Using Diffractive Cameras

Figure 10A:
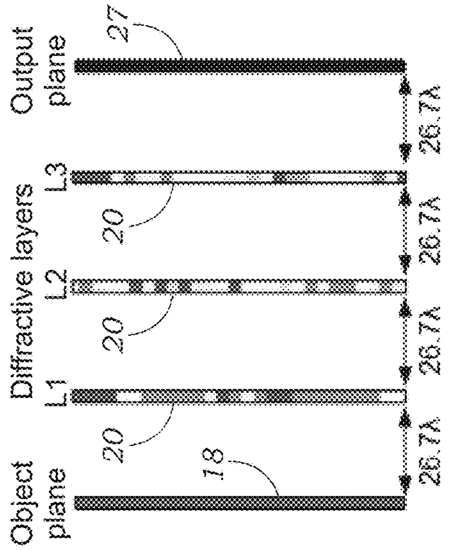
FIG. 10A illustrates the physical layout of the three-layer diffractive camera design including the spacing between the layers and object plane and output plane.

The class-specific camera design is first numerically demonstrated using the MNIST handwritten digit dataset, to selectively image handwritten digit '2' (the object class of interest) while instantaneously erasing the other handwritten digits. As illustrated in FIG. 10A, a three-layer diffractive network 10 with phase-only modulation layers was trained under an illumination wavelength of λ. Each diffractive layer (i.e., substrate layer 20 when physical embodiment made) contains 120×120 trainable transmission phase coefficients (i.e., diffractive features/neurons), each with a size of ~0.53λ. The axial distance between the input/sample plane and the first diffractive layer, between any two consecutive diffractive layers 20, and between the last diffractive layer and the output plane were all set to ~26.7λ. The phase modulation values of the diffractive neurons at each transmissive layer were iteratively updated using a stochastic gradient-descent-based algorithm to minimize a customized loss function, enabling object class-specific imaging. For the data class of interest, the training loss terms included the normalized mean square error (NMSE) and the negative Pearson Correlation Coefficient (PCC) between the output image and the input, aiming to optimize the image fidelity at the output plane for the correct class of objects 14. For all the other classes of objects 14 (to be all-optically erased), the statistical similarity was penalized between the output optical field or image 26 and the input object 14 (see Methods section for details). This well-balanced training loss function enabled the output images 26 from the non-target classes of objects 14 (i.e., the handwritten digits 0, 1, 3-9) to be all-optically erased at the output FOV, forming speckle-like background patterns with lower average intensity, whereas all the input objects 14 of the target data class (i.e., handwritten examples of digit "2") formed high-quality images 26 at the output plane. The resulting diffractive layers that are learned through this data-driven training process are reported in FIG. 10B, which collectively function as a spatial mode filter that is data class-specific.

After its training, this diffractive camera design was numerically tested using 10,000 MNIST test digits, which were not used during the training process. FIG. 10C reports some examples of the blind testing output of the trained diffractive network 10 and the corresponding input objects 14. These results demonstrate that the diffractive camera 2 learned to selectively image the input objects 14 that belong to the target data class, even if they have statistically diverse styles due to the varying nature of human handwriting. As desired, the diffractive camera 2 generates unrecognizable noise-like patterns for the input objects 14 from all the other non-target data classes, all-optically erasing their information at its output plane. Stated differently, the image formation is intervened at the coherent wave propagation stage for the undesired data classes, where the characteristic optical modes that statistically represent the input objects 14 of these non-target data classes are scattered out of the output FOV of the diffractive camera 2.

Importantly, this diffractive camera 2 is not based on a standard point-spread function-based pixel-to-pixel mapping between the input and output FOVs, and therefore, it does not automatically result in signals within the output FOV for the transmitting input pixels that statistically overlap with the objects 14 from the target data class. For example, the handwritten digits '3' and '8' in FIG. 10C were completely erased at the output FOV, regardless of the considerable amount of common (transmitting) pixels that they statistically share with the handwritten digit '2'. Instead of developing a spatially-invariant point-spread function, the designed diffractive camera 2 statistically learned the characteristic optical modes possessed by different training examples, to converge as an optical mode filter, where the main modes that represent the target class of objects 14 can pass through with minimum distortion of their relative phase and amplitude profiles, whereas the spatial information carried by the characteristic optical modes of the other data classes were scattered out. The deep learning-based optimization using the training images/examples is the key for the diffractive camera 2 to statistically learn which optical modes must be filtered out and which group of modes needs to pass through the substrate layers 20 so that the output images 26 accurately represent the spatial features of the input objects 14 for the correct data class. As detailed in the Methods section, the training loss function and its penalty terms for the target data class and the other classes are crucial for achieving this performance.

Figure 10B:
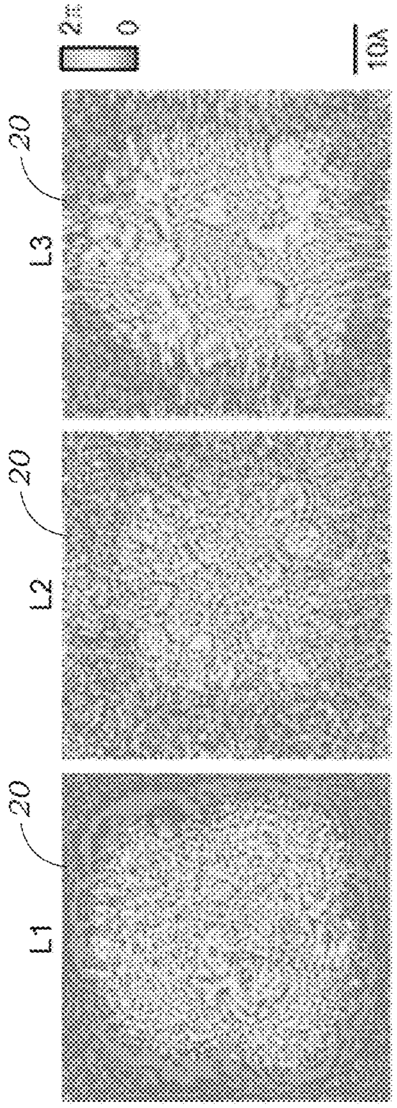
FIG. 10B illustrates the phase modulation patterns of the converged diffractive layers of the camera.
Figure 10C:
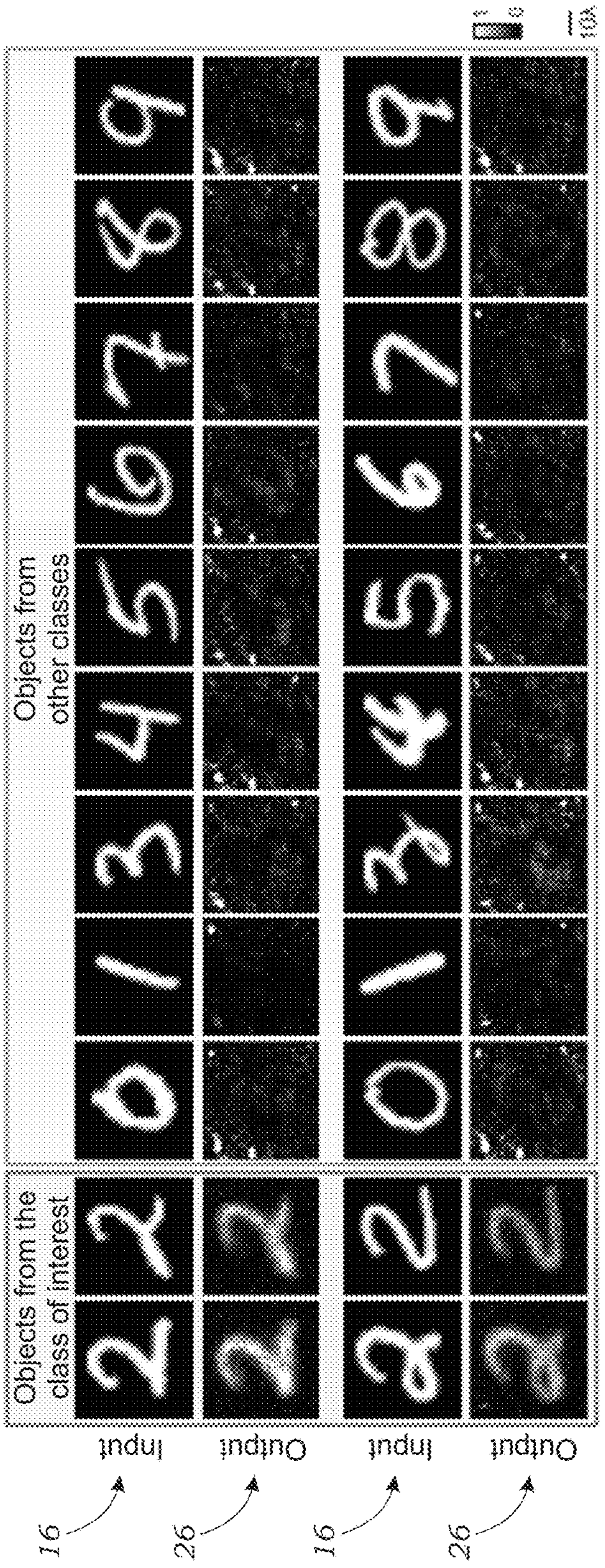
FIG. 10C illustrates the blind testing results of the diffractive camera. The output images were normalized using the same constant for visualization.
Figure 16A:
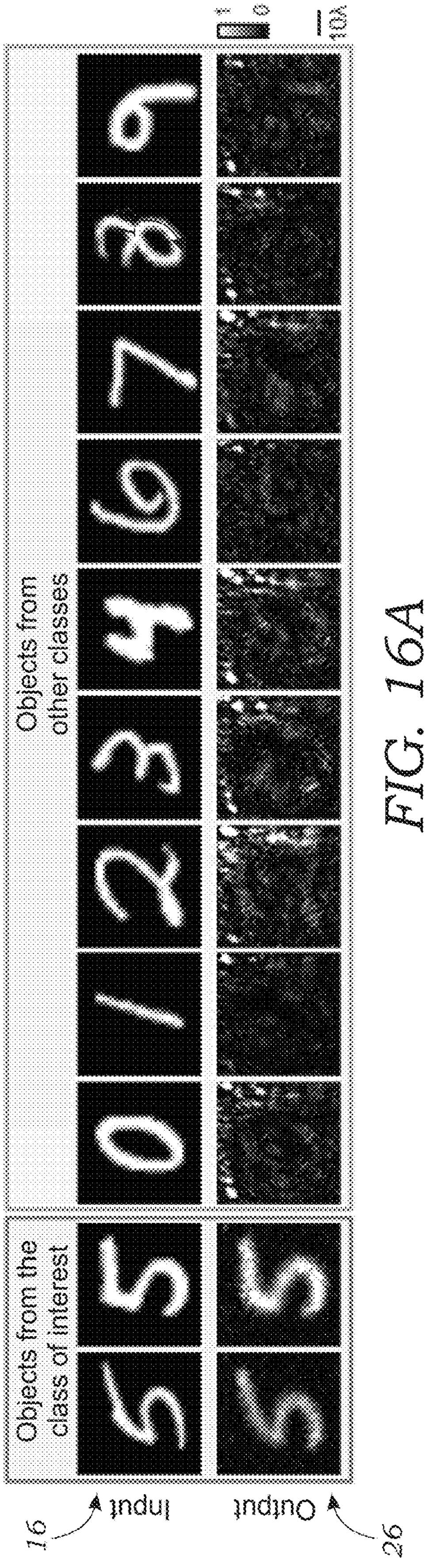
FIG. 16A illustrates the blind testing results when the target class of interest was chosen as the handwritten digit '5'.
Figure 16B:
FIG. 16B illustrates the blind testing results when the target class of interest was chosen as the handwritten digit '7'. The second output of '7' misses a stroke since this handwriting style appears much less frequently in the training data set (i.e., ~12% among all the handwritten '7's).
Figure 16C:
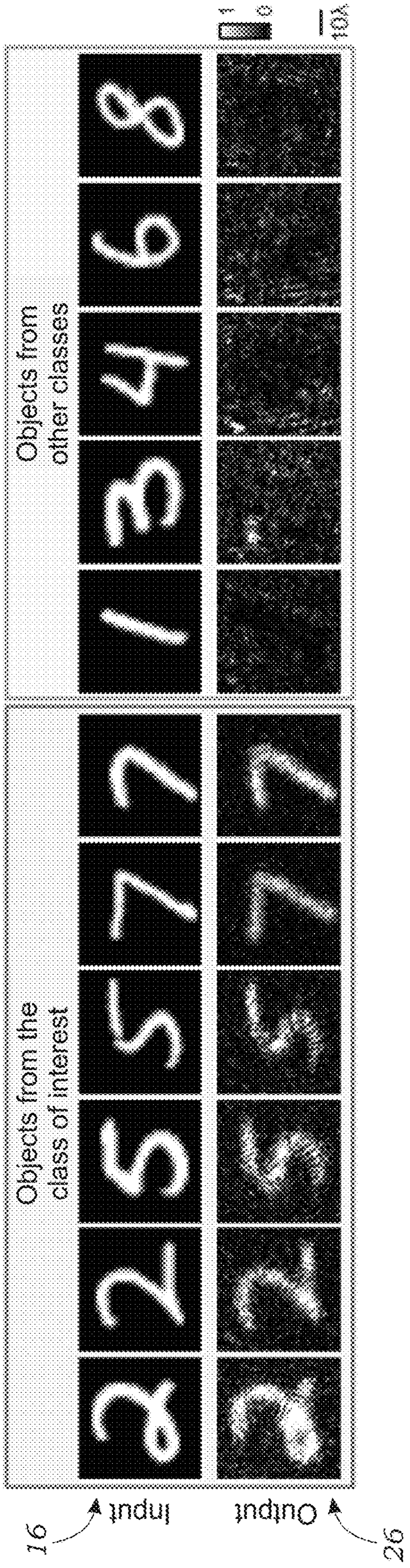
FIG. 16C illustrates the blind testing results when the target classes of interest were chosen as digits '2', '5', and '7'—altogether. The output images at each row were adjusted using the same constant for visualization.

In addition to these results summarized in FIGS. 10A-10C, the same class-specific camera 2 can also be adapted to selectively image input objects 14 of other data classes by simply re-dividing the training image dataset into desired/target vs. unwanted classes of objects 14. To demonstrate this, different diffractive camera designs are illustrated in FIGS. 16A-16C, where the same class-specific performance was achieved for the selective imaging of e.g., handwritten test objects from digits '5' or '7', while all-optically erasing the other data classes at the output FOV. Even more remarkable, the diffractive camera design can also be optimized to selectively image a desired group of data classes (i.e., a plurality of data classes), while still rejecting the objects 14 of the other data classes. For example, FIGS. 16A-16C report a diffractive camera 2 that successfully imaged handwritten test objects belonging to digits '2', '5', and '7' (defining the target group of data classes), while erasing all the other handwritten digits all-optically. Stated differently, the diffractive camera 2 was in this case optimized to selectively image three different data classes in the same design, while successfully filtering out the remaining data classes at its output FOV (see FIGS. 16A-16C).

Figure 11A:
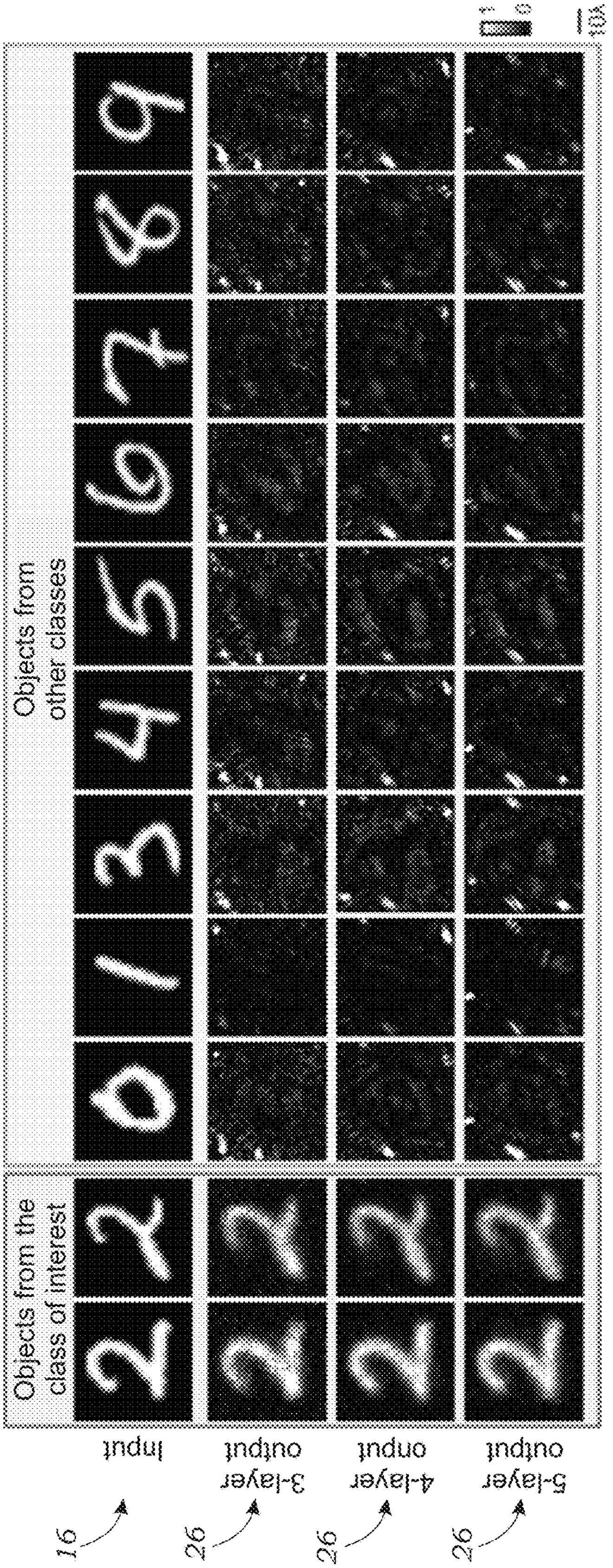
FIG. 11A illustrates a comparison of the output images using diffractive camera designs with three, four, and five layers. The output images at each row were normalized using the same constant for visualization.
Figure 11B:
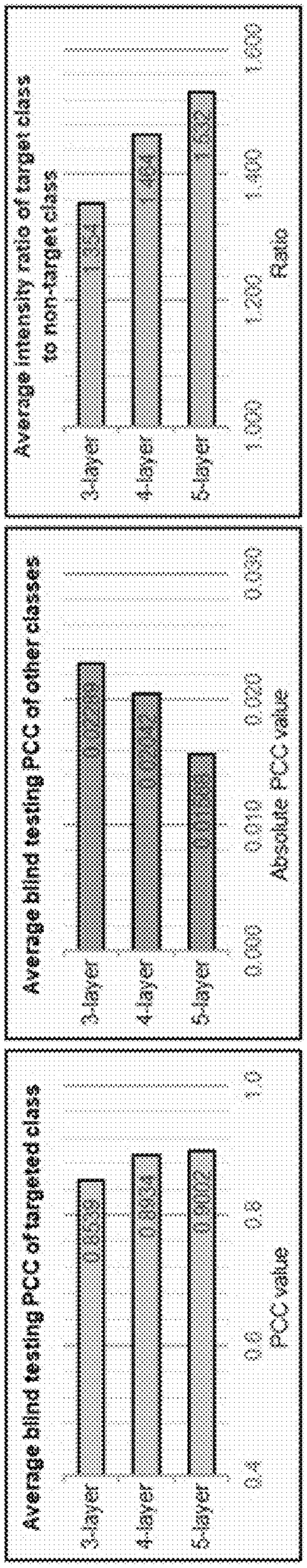
FIG. 11B illustrates a quantitative comparison of the three diffractive camera designs. The left panel compares the average PCC values calculated using input objects from the target data class only (i.e., 1032 different handwritten digits). The middle panel compares the average absolute PCC values calculated using input objects from the other data classes (i.e., 8968 different handwritten digits). The right panel plots the average output intensity ratio (R) of the target to non-target data classes.
Figure 17A:
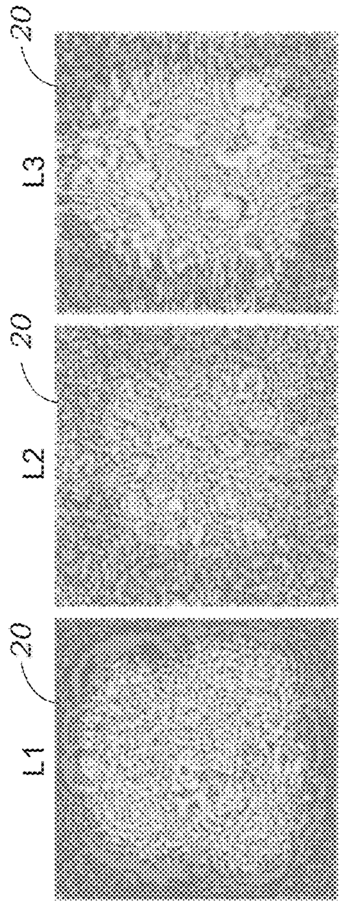
FIGS. 17A-17C illustrate converged diffractive layers for the diffractive camera designs with different numbers of diffractive layers.
Figure 17B:
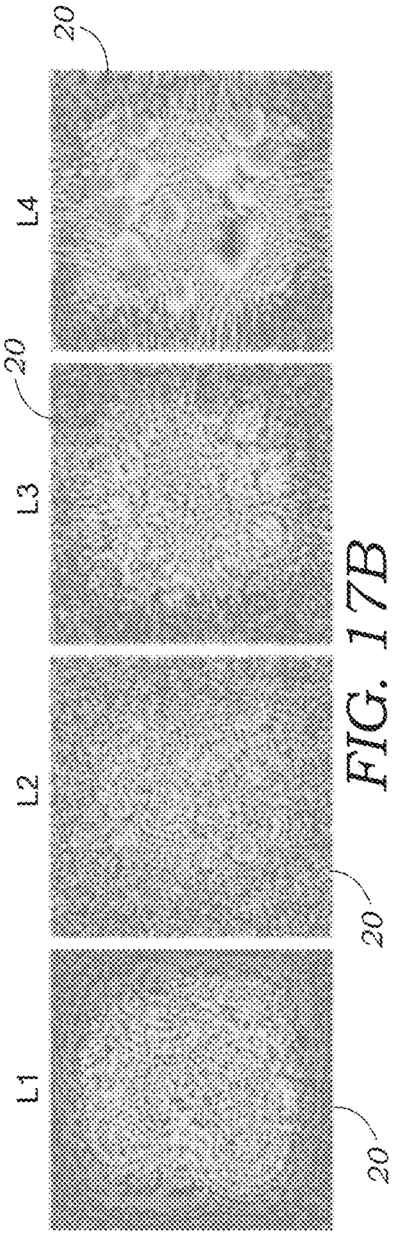
Figure 17C:
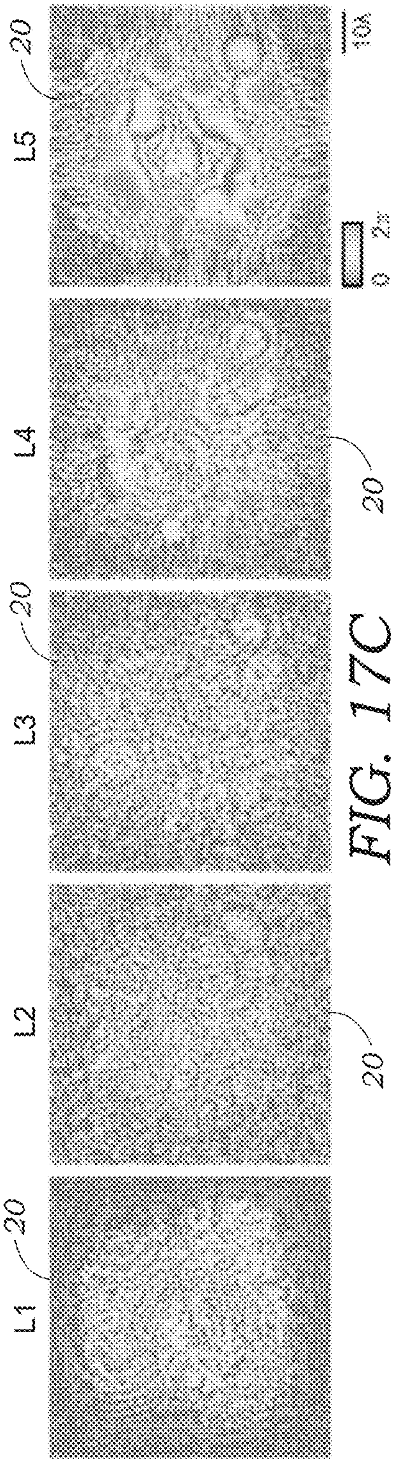

Next, the performance of the diffractive camera 2 was evaluated with respect to the number of substrate layers 20 in its design (see FIGS. 11A-11B). Except for the number of substrate layers 20, all the other hyperparameters of these camera designs were kept the same as before, for both the training and testing procedures. The patterns of the converged substrate layers 20 of each camera design are illustrated in FIGS. 17A-17C. The comparison of the class-specific imaging performance of these diffractive cameras 2 with different numbers of trainable substrate layers 20 can be found in FIGS. 11A-11B. Improved fidelity of the output images 26 corresponding to the objects 14 from the target data class can be observed as the number of substrate layers 20 increases, exhibiting higher image contrast, closely matching the input object features (FIG. 11A). At the same time, for the input objects 14 from the non-target data classes, all the three diffractive camera designs generated unrecognizable noise-like patterns, all-optically erasing their information at the output. The blind testing performance of each diffractive camera design was further determined by calculating the average PCC value between the output images 26 and the ground truth (i.e., input objects); see FIG. 11B. For this quantitative analysis, the MNIST testing dataset was first divided into target class objects ($n_1$=1032 handwritten test objects for digit '2') and non-target class objects ($n_2$=8968 handwritten test objects for all the other digits), and the average PCC value was calculated separately for each object group. For the target data class of interest, the higher PCC value presents an improved imaging fidelity. For the other, non-target data classes, however, the absolute PCC values were used as an "erasure figure-of-merit", as the PCC values close to either 1 or −1 can indicate interpretable image information, which is undesirable for object erasure. Therefore, the average PCC values of the target class objects ($n_1$) and the average absolute PCC values of the non-target classes of objects ($n_2$) are presented in the first two charts in FIG. 11B. The depth advantage of the class-specific diffractive camera designs is clearly demonstrated in these results, where a deeper diffractive imager with e.g., five substrate layers 20 achieved (1) a better output image fidelity and a higher average PCC value for imaging the target class of objects 14, and (2) an improved all-optical erasure of the undesired objects 14 (with a lower absolute PCC value) for the non-target data classes as shown in FIG. 11B.

In addition to these, a deeper diffractive camera 2 also creates a stronger signal intensity separation between the output images 26 of the target and non-target data classes. To quantify this signal-to-noise ratio advantage at the output FOV, the average output intensity ratio (R) of the target to non-target data classes is defined as:

$$R = \frac{\frac{1}{n_1}\sum_{i=1}^{n_1}\overline{O_i^+}}{\frac{1}{n_2}\sum_{i=1}^{n_2}\overline{O_i^-}} \tag{1}$$

where the numerator is the average output intensity of $n_1$=1032 test objects from the target data class (denoted as $O_i^+$), and the denominator is the average output intensity of $n_2$=8968 test objects from all the other data classes (denoted as $O_i^-$).

The R values of three-four-, and five-layer diffractive camera designs were found to be 1.354, 1.464, and 1.532, respectively, as summarized in FIG. 11B. These quantitative results once again confirm that a deeper diffractive camera 2 with more trainable substrate layers 20 exhibits a better performance in its class-specific imaging task and achieves an improved signal-to-noise ratio at its output.

Simultaneous Imaging of Multiple Objects from Different Data Classes

Figure 12A:
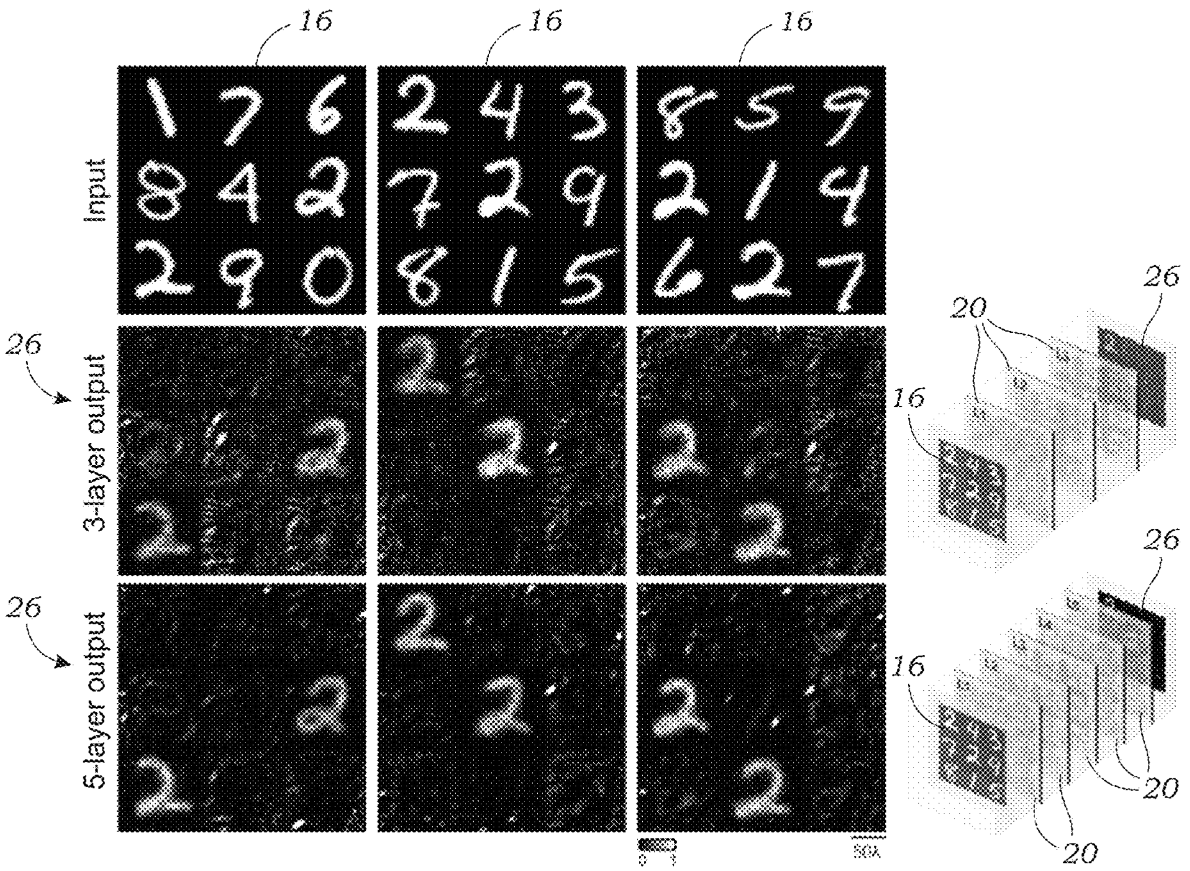
FIG. 12A schematically illustrates the simultaneous imaging of multiple objects of different data classes using a diffractive camera along with the bind testing results obtained with a three-layer diffractive camera and a five-layer diffractive camera. The output images in each row were normalized using the same constant for visualization.
Figure 12B:
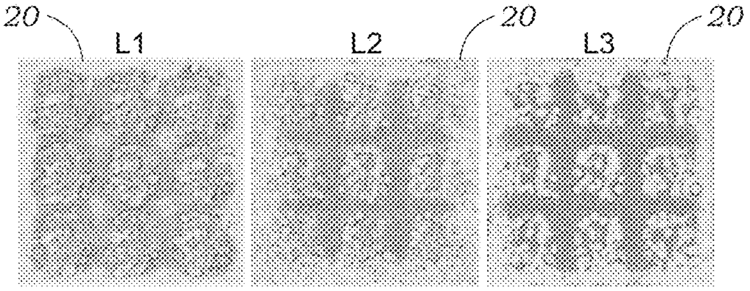
FIG. 12B illustrates phase modulation patterns of the converged diffractive layers for the three-layer diffractive camera design.

In a more general scenario, multiple objects 14 of different classes can be presented in the same input FOV. To exemplify such an imaging scenario, the input FOV of the diffractive camera 2 was divided into 3×3 subregions, and a random handwritten digit/object could appear in each subregion (see e.g., FIGS. 12A-12C). Based on this larger FOV with multiple input objects 14, a three-layer and a five-layer diffractive camera 2 were separately designed to selectively image the whole input plane, all-optically erasing all the presented objects 14 from the non-target data classes (FIG. 12A). The design parameters of these diffractive cameras 2 were the same as the cameras 2 reported in the previous subsection, except that each substrate layer 20 was expanded from 120×120 to 300×300 diffractive pixels to accommodate the increased input FOV. During the training phase, 48,000 MNIST handwritten digits appeared randomly at each subregion, and the handwritten digit '2' was selected as the target data class to be specifically imaged. The substrate layers 20 of the converged camera designs are shown in FIG. 12B for the three-layer diffractive camera 2 and in FIG. 12C for the five-layer diffractive camera 2.

During the blind testing phase of each of these diffractive cameras 2, the input test objects 14 were randomly generated using the combinations of 10,000 MNIST test digits (not included in the training). The imaging results reported in FIG. 12A reveal that these diffractive camera designs can selectively image the handwritten test objects 14 from the target data class, while all-optically erasing the other objects 14 from the remaining digits in the same FOV, regardless of which subregion they are located at. It is also demonstrated that, compared with the three-layer design, the deeper diffractive camera 2 with five trained substrate layers 20 generated output images 26 with improved fidelity and higher contrast for the target class of objects 14, as shown in FIG. 12A. At the same time, this deeper diffractive camera 2 achieved stronger suppression of the objects from the non-target data classes, generating lower output intensities for these undesired objects 14.

Class-Specific Permutation Camera Design

Apart from directly imaging the objects 14 from a target data class, a class-specific diffractive camera 2 can also be designed to output pixel-wise permuted images 26 of target objects 14, while all-optically erasing other types of objects 14. To demonstrate this class-specific image permutation as a form of all-optical encryption, a five-layer diffractive permutation camera 2 was designed, which takes MNIST handwritten digits as its input 16 and performs an all-optical permutation only on the target data class (e.g., handwritten digit '2'). The corresponding inverse permutation operation can be sequentially applied on the pixel-wise permuted output images 26 to recover the original handwritten digits, '2'. The other handwritten digits, however, will be all-optically erased, with noise-like features appearing at the output FOV, before and after the inverse permutation operation (FIG. 13A). Stated differently, the all-optical permutation of this diffractive camera 2 operates on a specific data class, whereas the rest of the objects 14 from other data classes are irreversibly lost/erased at the output FOV.

To design this class-specific permutation camera 2, a random permutation matrix P was first generated (FIGS. 13A-13B), which describes a unique one-to-one mapping of each image pixel at the input FOV to a new location/pixel at the output FOV. This randomly selected, desired permutation matrix P was applied to each input image G and the resulting permuted image (PG) was used as the ground truth throughout the training process of the permutation camera 2. The training loss function remained the same as in the previous five-layer diffractive design reported in FIG. 11A; however, instead of calculating the loss using the output and the input (G) images, this class-specific permutation camera design was optimized by minimizing the loss calculated using the output images 26 and the permuted input images (PG). The converged diffractive layers of this class-specific permutation camera are presented in FIG. 13B.

During the blind testing phase, the designed class-specific permutation camera 2 was tested with 10,000 MNIST digits, never used in the training phase. As demonstrated in FIG. 13A, this permutation camera 2 learned to selectively permute the input images 16 of objects 14 that belong to the target class (i.e., the handwritten digit '2'), generating an output optical field 26 (i.e., intensity patterns) that closely resemble PG. This class-specific all-optical permutation operation performed by the diffractive camera 2 resulted in uninterpretable patterns of the target objects at the output FOV, which cannot be decoded without the knowledge of the permutation matrix, P. On the other hand, for the input images 16 of objects 14 that belong to other data classes, the same permutation camera design generated noise-like, low-intensity patterns that do not match the permuted images (PG). In fact, by applying the inverse permutation ($P^{-1}$) operation on the output images 26 of the diffractive camera 2, the original digits of interest from the target data class can be faithfully reconstructed, whereas all the other classes of objects 14 ended up in noise-like patterns (see the last column of FIG. 13A), which illustrates the success of this class-specific permutation camera 2.

Experimental Demonstration of a Class-Specific Diffractive Camera

Figure 14A:
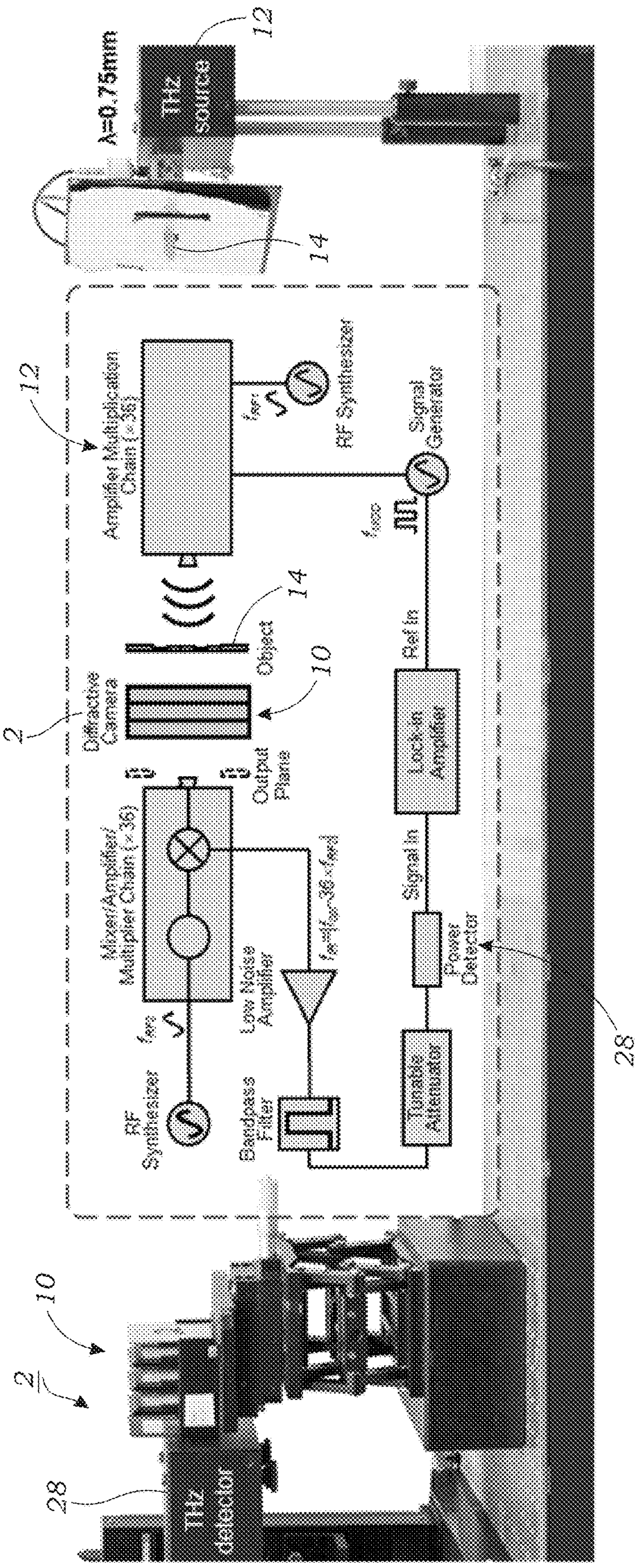
FIG. 14A illustrates the experimental setup for object class-specific imaging using a diffractive camera using THz illumination.
Figure 14C:
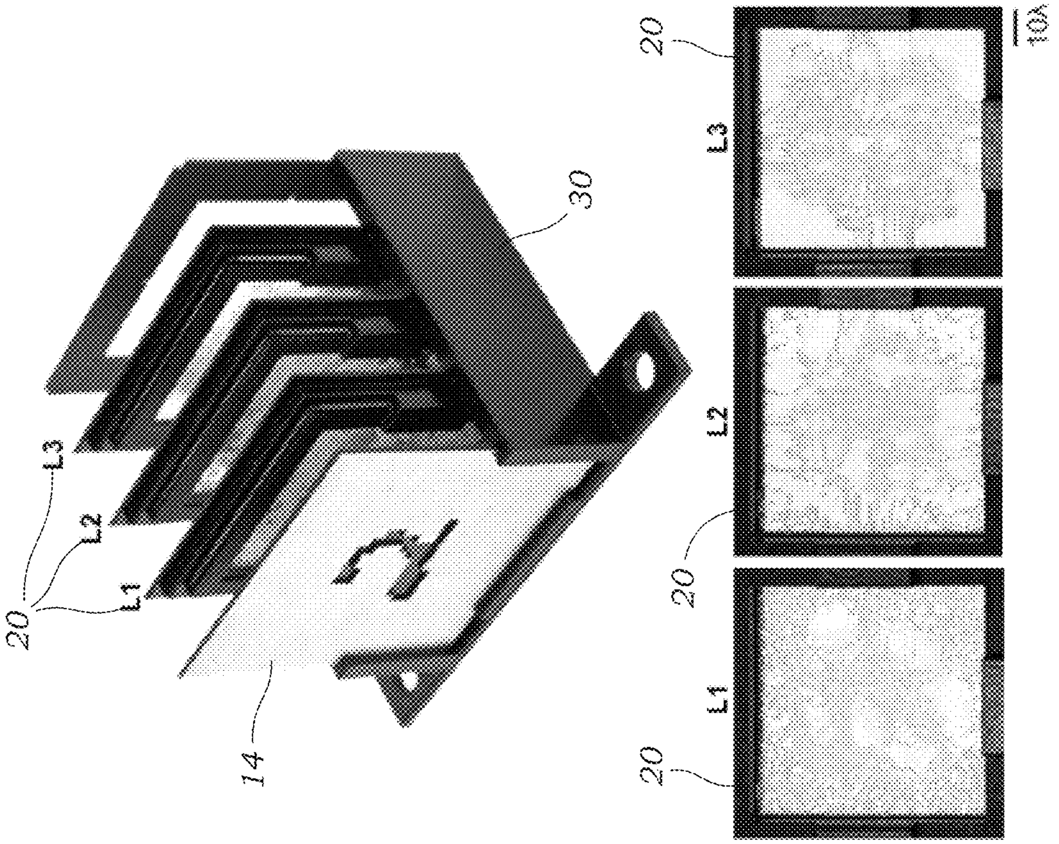
FIG. 14C illustrates photographs of the 3D printed layers and the assembled diffractive camera.
Figure 14B:
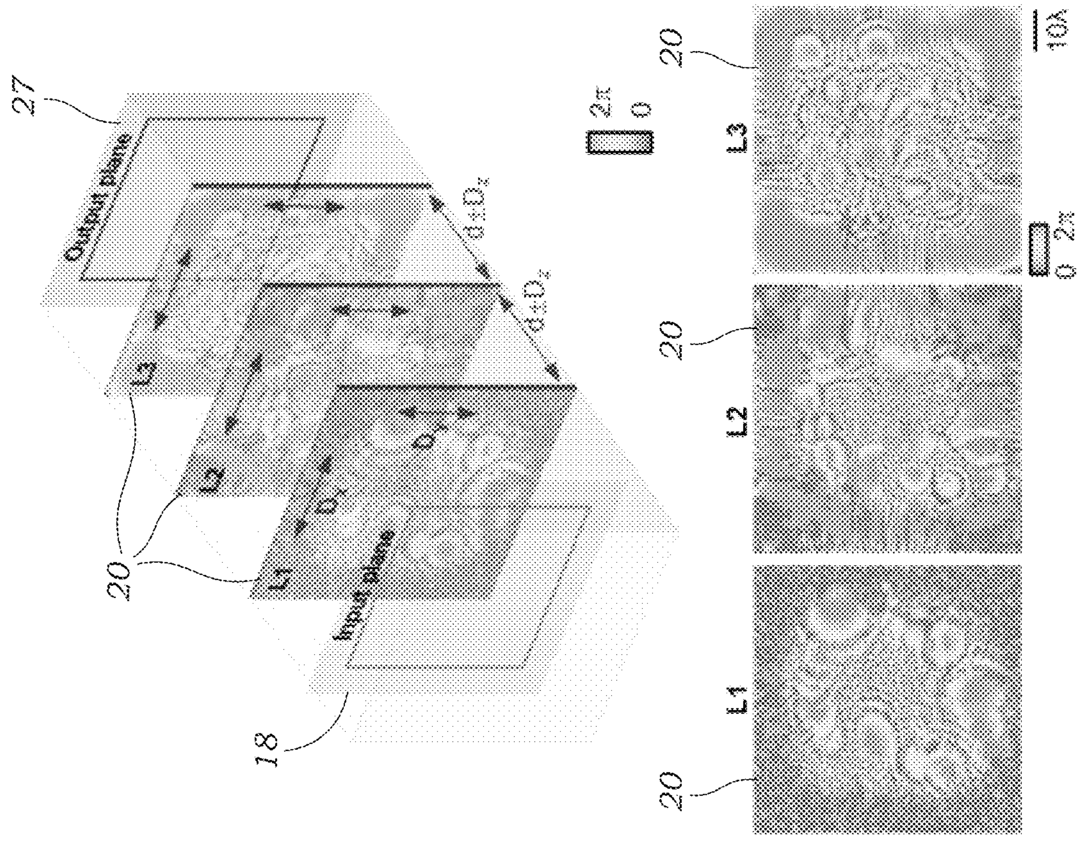
FIG. 14B schematically illustrates the misalignment resilient training of the diffractive camera and the converged phase patterns (bottom).

The proof of concept of a class-specific diffractive camera 2 was experimentally demonstrated by fabricating and assembling the diffractive layers using a 3D printer and testing it with a continuous wave source at $\lambda$=0.75 mm (FIG. 14A). For these experiments, a three-layer diffractive camera design was trained using the same configuration as the system reported in FIGS. 10A-10C, with the following changes: (1) the diffractive camera 2 was "vaccinated" during its training phase against potential experimental misalignments, by introducing random displacements to the diffractive layers during the iterative training and optimization process (FIG. 14B, see the Methods section for details); (2) the handwritten MNIST objects were down-sampled to 15×15 pixels to form the 3D-fabricated input objects 14; (3) an additional image contrast-related penalty term was added to the training loss function to enhance the contrast of the output images 26 from the target data class, which further improved the signal-to-noise ratio of the diffractive camera design. The resulting substrate layers 20, including the pictures of the 3D-printed camera 2, are shown in FIGS. 14B-14C.

Figure 15:
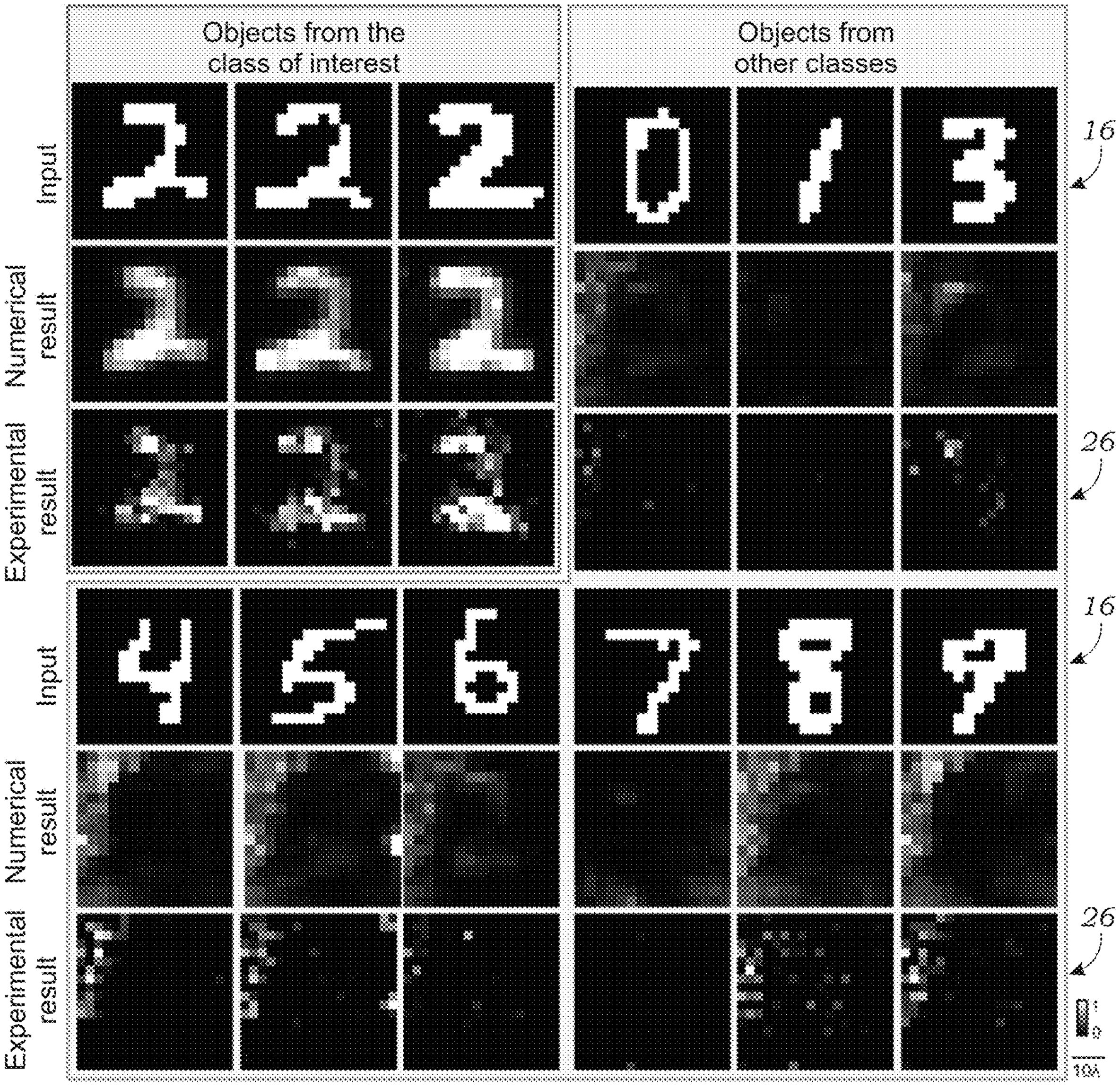
FIG. 15 illustrates the experimental results of object class-specific imaging using a 3D-printed diffractive camera.

To blindly test the 3D-assembled diffractive camera 2 (FIG. 14C), twelve (12) different MNIST handwritten digits, including three (3) digits from the target data class (digit '2') and nine digits from the other data classes were used as the input test objects 14 for the diffractive camera 2. The output FOV of the diffractive camera 2 (36×36 $mm^2$) was scanned using a THz detector as the optical sensor 28 forming the output images 26. The experimental imaging results of the 3D-printed diffractive camera 2 are demonstrated in FIG. 15, together with the input images 16 of the test objects 14 and the corresponding numerical simulation results for each input object 14. The experimental results show a high degree of agreement with the numerically expected results based on the optical forward model of the diffractive camera 2, and it was observed that the test objects 14 from the target data class were imaged well, while the other non-target test objects 14 were completely erased at the output FOV of the camera 2. The success of these proof-of-concept experimental results further confirms the feasibility of the class-specific diffractive camera design.

Discussion

A diffractive camera 2 is disclosed herein that performs class-specific imaging of target objects 14 while instantaneously erasing other objects 14 all-optically, which provides an energy-efficient, task-specific and secure solution to privacy-preserving imaging. Unlike conventional privacy-preserving imaging methods that rely on post-processing of images after their digitization, the diffractive camera 2 enforces privacy protection by selectively erasing the information of the non-target objects 14 during the light propagation, which reduces the risk of recording sensitive raw image data.

To make this diffractive camera 2 even more resilient against potential adversarial attacks, one can monitor the illumination intensity as well as the output signal intensity and accordingly trigger the camera 2 recording (i.e., capturing and/or digitizing the image) only when the output signal detected by the optical sensor(s) 28 is above a certain threshold. Based on the intensity separation that is created by the class-specific imaging performance of the diffractive camera 2, an intensity threshold can be determined at the output image sensor(s) 28 to trigger image capture or image digitization only when a sufficient number of photons are received, which would eliminate the recording of any digital signature corresponding to non-target objects 14 at the input FOV. Such an intensity threshold-based recording for class-specific imaging also eliminates unnecessary storage and transmission of image data by only digitizing the target information of interest from the desired data classes.

In addition to securing the information of the undesired objects 14 by all-optically erasing them at the output FOV, the class-specific permutation camera 2 reported in FIGS. 13A-13B can further perform all-optical image encryption for the desired class of objects 14, providing an additional layer of data security. Through the data-driven training process, the class-specific permutation camera 2 learns to apply a randomly selected permutation operation on the target class of input objects 14, which can only be inverted with the knowledge of the inverse permutation operation; this class-specific permutation camera 2 can be used to further secure the confidentiality of the images of the target data class.

Compared to the traditional digital processing-based methods, the diffractive camera 2 has the advantages of speed and resource savings since the entire non-target object erasure process is performed as the input light diffracts through a thin camera volume at the speed of light. The functionality of this diffractive camera 2 can be enabled on demand by turning on the coherent illumination source 12, without the need for any additional digital computing units or an external power supply, which makes it especially beneficial for power-limited and continuously working remote systems.

It is important to emphasize that the presented diffractive camera 2 does not possess a traditional, spatially-invariant point-spread function. A trained diffractive camera 2 performs a learned, complex-valued linear transformation between the input and output fields that statistically represents the coherent imaging of the input objects 14 from the target data class. Through the data-driven training process using examples of the input objects 14, this complex-valued linear transformation performed by the diffractive camera 2 converged into an optical mode filter that, by and large, preserves the phase and amplitude distributions of the propagating modes that characteristically represent the objects 14 of the target data class. Because of the additional penalty terms that are used to all-optically erase the undesired data classes, the same complex-valued linear transformation also acts as a modal filter, scattering out the characteristic modes that statistically represent the other types of objects that do not belong to the target data class. Therefore, each class-specific diffractive camera design results from this data-driven learning process through training examples, optimized via error backpropagation and deep learning.

Also, note that the experimental proof of concept for the diffractive camera 2 was demonstrated using a spatially-coherent and monochromatic THz illumination source 12, whereas the most commonly used imaging systems in the modern digital world are designed for visible and near-infrared wavelengths, using broadband and incoherent (or partially-coherent) light. With the recent advancements in state-of-the-art nanofabrication techniques such as electron-beam lithography and two-photon polymerization, diffractive camera designs can be scaled down to micro-scale, in proportion to the illumination wavelength in the visible spectrum, without altering their design and functionality. Therefore, nanofabricated, compact diffractive cameras 2 that can work in the visible and infrared parts of the spectrum using partially-coherent broadband radiation from e.g., light-emitting diodes (LEDs) or an array of laser diodes would be feasible.

Methods

Forward-Propagation Model of a Diffractive Camera

For a diffractive camera 2 with N diffractive layers, the forward propagation of the optical field can be modeled as a sequence of (1) free-space propagation between the $l^{th}$ and $(l+1)^{th}$ layers (l=0, 1, 2, . . . , N), and (2) the modulation of the optical field by the $l^{th}$ diffractive layer (l=1, 2, . . . , N), where the $0^{th}$ layer denotes the input/object plane and the $(N+1)^{th}$ layer denotes the output/image plane. The free-space propagation of the complex field is modeled following the angular spectrum approach. The optical field $u^l(x, y)$ right after the $l^{th}$ layer after being propagated for a distance of d can be written as:

$$\mathbb{P}_d u^l(x, y) = \mathcal{F}^{-1}\{\mathcal{F}\{u^l(x, y)\}H(f_x, f_y; d)\} \tag{2}$$

where $\mathbb{P}_d$ represents the free-space propagation, operator $\mathcal{F}$ and $\mathcal{F}^{-1}$ are the two-dimensional Fourier transform and the inverse Fourier transform operations, and $H(f_x, f_y; d)$ is the transfer function of free space:

$$H(f_x, f_y; d) = \begin{cases} \exp\left\{jkd\sqrt{1 - \left(\frac{2\pi f_x}{k}\right)^2 - \left(\frac{2\pi f_y}{k}\right)^2}\right\}, & f_x^2 + f_y^2 < \frac{1}{\lambda^2} \\ 0, & f_x^2 + f_y^2 \geq \frac{1}{\lambda^2} \end{cases} \tag{3}$$

where $$j = \sqrt{-1},\ k = \frac{2\pi}{\lambda}$$

and λ is the wavelength of the illumination light. $f_x$ and $f_y$ are the spatial frequencies along the x and y directions, respectively.

If one considers only the phase modulation of the transmitted field at each layer, where the transmittance coefficient $t^l$ of the $l^{th}$ diffractive layer can be written as:

$$t^l(x, y) = \exp\{j\phi^l(x, y)\} \tag{4}$$

where $\phi^l(x, y)$ denotes the phase modulation of the trainable diffractive neuron located at (x, y) position of the $l^{th}$ diffractive layer. Based on these definitions, the complex optical field at the output plane of a diffractive camera 2 can be expressed as:

$$o(x, y) = \mathbb{P}_{d_{N,N+1}}\left(\prod_{l=N}^{1} t^l(x, y)\cdot \mathbb{P}_{d_{l-1,l}}\right)g(x, y) \tag{5}$$

where $d_{l-1,l}$ represents the axial distance between the $(l-1)^{th}$ and the $l^{th}$ layers, g(x, y) is the input optical field, which is the amplitude of the input objects (handwritten digits) used in this work.

Training Loss Function

The reported digital models of the diffractive cameras 2 were optimized by minimizing the loss functions that were calculated using the intensities of the input and output images. The input and output intensities G and O, respectively, can be written as:

$$G(x, y) = |g(x, y)|^2 \quad (6)$$

$$O(x, y) = |o(x, y)|^2 \quad (7)$$

The loss function, calculated using a batch of training input objects G with the corresponding output images O can be defined as:

$$\text{Loss}(O, G) = \text{Loss}_+(O^+, G^+) + \text{Loss}_-(O^-, G^-, G_k^+) \quad (8)$$

where $O^+$, $G^+$ represent the output and input images from the target data class (i.e., desired object class), and $O^-$, $G^-$ represent the output and input images 26, 16, respectively, from the other data classes (to be all-optically erased), respectively.

The $\text{Loss}_+$ is designed to reduce the NMSE and enhance the correlation between any target class input object $O^+$ and its output image $G^+$, i.e., $$\text{Loss}_+(O^+, G^+) = \alpha_1 \times NMSE(O^+, G^+) + \alpha_2 \times (1 - PCC(O^+, G^+)) \quad (9)$$

where $\alpha_1$ and $\alpha_2$ are constants and NMSE is defined as:

$$NMSE(O^+, G^+) = \frac{1}{MN}\sum_{m,n}\left(\frac{O_{m,n}^+}{\max(O^+)} - G_{m,n}^+\right)^2 \quad (10)$$

m and n are the pixel indices of the images, and MN represents the total number of pixels in each image. The output image $O^+$ was normalized by its maximum pixel value, max ($O^+$). The PCC value between any two images A and B is calculated using:

$$PCC(A, B) = \frac{\sum(A - \bar{A})(B - \bar{B})}{\sqrt{\sum(A - \bar{A})^2\sum(B - \bar{B})^2}} \quad (11)$$

The term $(1-PCC(O^+, G^+))$ was used in $\text{Loss}_+$ in order to maximize the correlation between $O^+$ and $G^+$, as well as to ensure a non-negative loss value since the PCC value of any two images is always between −1 and 1.

Different from $\text{Loss}_+$, the Loss_function is designed to reduce (1) the absolute correlation between the output $O^-$ and its corresponding input $G^-$, (2) the absolute correlation between $O^-$ and an arbitrary object $$G_k^+$$

from the target class, and (3) the correlation between $O^-$ and itself shifted by a few pixels $$O_{sft}^-,$$

which can be formulated as:

$$\text{Loss}_-(O^-, G^-, G_k^+) = \beta_1 \times |PCC(O^-, G^-)| + \beta_2 \times |PCC(O^-, G_k^+)| + \beta_3 \times PCC(O^-, O_{sft}^-) \quad (12)$$

where $\beta_1$, $\beta_2$ and $\beta_3$ are constants. Here the $$G_k^+$$

refers to an image of an object from the target data class in the training set, which was randomly selected for every training batch, and the subscript k refers to a random index. In other words, within each training batch, the $$PCC(O^-, G_k^+)$$

was calculated using the output image 26 from the non-target data class and a random ground truth image from the target class. By adding such a loss term, the diffractive camera 2 is prevented from converging to a solution where all the output images 26 look like the target object. The $$O_{sft}^-$$

was obtained using:

$$O_{sft}^-(x, y) = O^-(x - s_x, y - s_y) \quad (13)$$

where $s_x = s_y = 5$ denote the number of pixels that $O^-$ is shifted in each direction. By minimizing $$PCC(O^-, G_{sft}^-),$$

the diffractive camera 2 is forced to generate uninterpretable noise-like output patterns for input objects that do not belong to the target data class.

The coefficients ($\alpha_1$, $\alpha_2$, $\beta_1$, $\beta_2$, $\beta_3$) in the two loss functions were empirically set to (1, 3, 6, 3, 2).

Digital Implementation and Training Scheme

The diffractive camera digital models were trained with the standard MNIST handwritten digit dataset under $\lambda$=0.75 mm illumination. Each diffractive layer or substrate layer 20 has a pixel/neuron size of 0.4 mm, which only modulates the phase of the transmitted optical field. The axial distance between the input plane and the first substrate layer 20, the distances between any two successive substrate layers 20, and the distance between the last substrate layer 20 and the output plane are set to 20 mm, i.e., $d_{l-1,l}$=20 mm (l=1, 2, . . . , N+1). For the diffractive camera models that take a single MNIST image as its input (e.g., reported in FIGS. 10A-10C and 11A-11B), each substrate layer 20 contains 120×120 diffractive pixels. During the training, each 28×28 MNIST raw image was first linearly upscaled to 90×90 pixels. Next, the upscaled training dataset was augmented with random image transformations, including a random rotation by an angle within [−10°, +10° ], a random scaling by a factor within [0.9, 1.1], and a random shift in each lateral direction by an amount of [−2.13λ, +2.13λ].

Figure 12C:
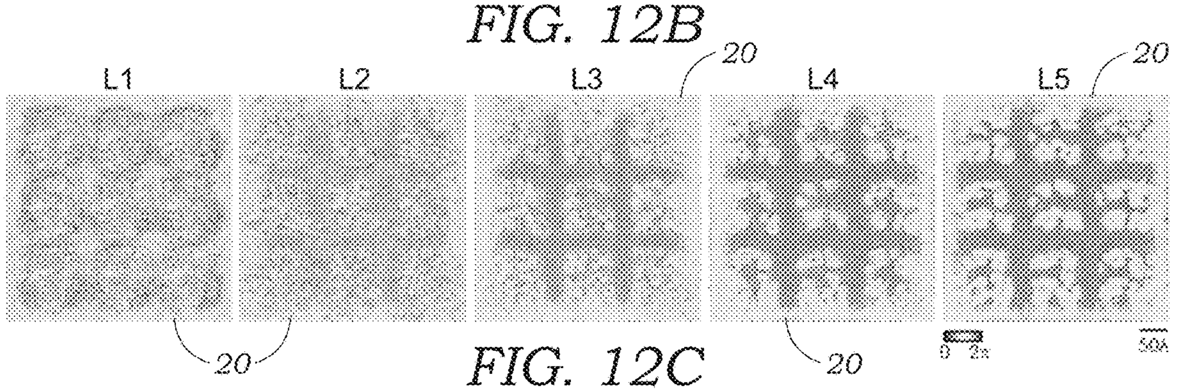
FIG. 12C illustrates the phase modulation patterns of the converged diffractive layers for the five-layer diffractive camera design.

For the diffractive camera model reported in FIGS. 12A-12C that takes multiplexed objects as its input, each substrate layer 20 contains 300×300 diffractive pixels. The MNIST training digits were first upscaled to 90×90 pixels and then randomly transformed with [−10°, +10° ] angular rotation, [0.9, 1.1] scaling, and [−2.13λ, +2.13λ] translation. Nine different handwritten digits were randomly selected and arranged into 3×3 grids, generating a multiplexed input image with 270×270 pixels for the diffractive camera 2 training.

For the diffractive permutation camera 2 reported in FIGS. 13A-13B, each substrate layer 20 contains 120×120 diffractive pixels. The design parameters of this class-specific permutation camera 2 were kept the same as the five-layer diffractive camera 2 reported in FIG. 11A, except that the handwritten digits were down-sampled to 15×15 pixels considering that the required computational training resources for the permutation operation increase quadratically with the total number of input image pixels. The MNIST training digits were augmented using the same random transformations as described above. The 2D permutation matrix P was generated by randomly shuffling the rows of a 225×225 identity matrix. The inverse of P was obtained by using the transpose operation, i.e., $P^{-1}=P^T$. The training loss terms for the class-specific permutation camera remained the same as described in Equations (8), (9), and (12), except that the permuted input images (PG) were used as the ground truth, i.e., $$\text{Loss}_{Permutation}(O, PG) = \text{Loss}_+(O^+, PG^+) + \text{Loss}_-(O^-, PG^-, PG_k^+) \quad (14)$$

The MNIST handwritten digit dataset was divided into training, validation, and testing datasets without any overlap, with each set containing 48,000, 12,000, and 10,000 images, respectively. The diffractive camera models were trained using the Adam optimizer with a learning rate of 0.03. The batch size used for all the trainings was 60. All models were trained and tested using PyTorch 1.11 with a GeForce RTX 3090 graphical processing unit (NVIDIA Inc.). The typical training time for a three-layer diffractive camera 2 (e.g., in FIGS. 10A-10C) is −21 hours for 1000 epochs.

Experimental Design

For the experimentally validated diffractive camera design shown in FIGS. 14A-14C, an additional contrast loss $L_c$ was added to $\text{Loss}_+$ i.e., $$\text{Loss}_+(O^+, G^+) = \alpha_1 \times NMSE(O^+, G^+) + \alpha_2 \times (1 - PCC(O^+, G^+)) + \alpha_3 \times L_c(O^+, G^+) \quad (15)$$

The coefficients ($\alpha_1$, $\alpha_2$, $\alpha_3$) were empirically set to (1, 3, 5) and $L_c$ is defined as:

$$L_c(O^+, G^+) = \frac{\sum (O^+ \cdot (1 - \widehat{G^+}))}{\sum (O^+ \cdot \widehat{G^+}) + \varepsilon} \quad (16)$$

where ε=1e$^{-6}$ was added to the denominator to avoid divide-by-zero error. $\widehat{G^+}$ is a binary mask indicating the transmissive regions of the input object $G^+$, which is defined as:

$$\widehat{G^+}(m, n) = \begin{cases} 1, & G^+(m, n) > 0.5 \\ 0, & \text{otherwise} \end{cases} \quad (17)$$

By adding this image contrast related training loss term, the output images 26 of the target objects 14 exhibit enhanced contrast which is especially helpful in non-ideal experimental conditions.

In addition, the MNIST training images were first linearly downsampled to 15×15 pixels and then upscaled to 90×90 pixels using nearest-neighbor interpolation. Then, the resulting input objects 14 were augmented using the same parameters as described before and were fed into the diffractive camera 2 for training. Each substrate layer 20 had 120×120 trainable diffractive neurons.

To overcome the challenges posed by the fabrication inaccuracies and mechanical misalignments during the experimental validation of the diffractive camera 2, the diffractive model was vaccinated during the training by deliberately introducing random displacements to the substrate layers 20. During the training process, a 3D displacement $D=(D_x, D_y, D_z)$ was randomly added to each diffractive layer following the uniform (U) random distribution:

$$D_x \sim U(-\Delta_{x,tr}, \Delta_{x,tr}) \quad (18)$$

$$D_y \sim U(-\Delta_{y,tr}, \Delta_{y,tr}) \quad (19)$$

$$D_z \sim U(-\Delta_{z,tr}, \Delta_{z,tr}) \quad (20)$$

where $D_x$ and $D_y$ denote the random lateral displacement of a diffractive layer in x and y directions, respectively. $D_z$ denotes the random displacement added to the axial distances between any two consecutive diffractive layers. $\Delta_{*,tr}$ represents the maximum amount of shift allowed along the corresponding axis, which was set as $\Delta_{x,tr}=A_y,t_r$=0.4 mm (~0.53λ), and $\Delta_{z,tr}$=1.5 mm (2A) throughout the training process. $D_x$, $D_y$, and $D_z$ of each substrate layer 20 were independently sampled from the given uniform random distributions. The diffractive camera model used for the experimental validation was trained for 50 epochs.

Experimental THz Imaging Setup

The fabricated diffractive camera 2 was validated using a THz continuous wave scanning system. The phase values of the substrate layers 20 were first converted into height maps using the refractive index of the 3D printer material. Then, the substrate layers 20 were printed using a 3D printer (Pr 110, CADworks3D). A substrate layer holder 30 that sets the positions of the input plane, output plane, and each substrate layer 20 was also 3D printed (Objet30 Pro, Stratasys) and assembled with the printed substrate layers 20. The test objects 14 were 3D printed (Objet30 Pro, Stratasys) and coated with aluminum foil to define the transmission areas.

The experimental setup is illustrated in FIG. 13A. The THz light source 12 used in the experiment was a WR2.2 modular amplifier/multiplier chain (AMC) with a compatible diagonal horn antenna (Virginia Diode Inc.). The input of AMC was a 10 dBm RF input signal at 11.1111 GHz ($f_{RF1}$) and after being multiplied 36 times, the output radiation was at 0.4 THz. The AMC was also modulated with a 1 kHz square wave for lock-in detection. The output plane of the diffractive camera 2 was scanned with a 1 mm step size using a single-pixel Mixer/AMC (Virginia Diode Inc.) detector 28 mounted on an XY positioning stage that was built by combining two linear motorized stages (Thorlabs NRT100). A 10 dBm RF signal at 11.083 GHz ($f_{RF2}$) was sent to the detector 28 as a local oscillator to down-convert the signal to 1 GHz. The down-converted signal was amplified by a low-noise amplifier (Mini-Circuits ZRL-1150-LN+) and filtered by a 1 GHz (+/−10 MHz) bandpass filter (KL Electronics 3C40-1000/T10-O/O). Then the signal passed through a tunable attenuator (HP 8495B) for linear calibration and a low-noise power detector (Mini-Circuits ZX47-60) for absolute power detection. The detector 28 output was measured by a lock-in amplifier (Stanford Research SR830) with the 1 kHz square wave used as the reference signal. Then the lock-in amplifier readings were calibrated into linear scale. A digital 2×2 binning was applied to each measurement of the intensity field to match the training feature size used in the design phase.

While embodiments of the present invention have been shown and described, various modifications may be made without departing from the scope of the present invention. For example, the diffractive camera 2 or diffractive network 10 may function at other wavelengths regions of the electromagnetic spectrum beyond the THz spectrum specifically tested herein. In addition, the diffractive network 10 may be contained in another portable device besides a camera 2. In addition, the diffractive camera 2 or the diffractive network 10 may incorporate one or more lenses or lens sets along the optical path 24. The invention, therefore, should not be limited, except to the following claims, and their equivalents.

What is claimed is:

1. A diffractive camera that captures images containing one or more target classes of objects while all-optically erasing and/or distorting one or more non-target classes of objects, the diffractive camera comprising:

a diffractive network that receives one or more input images or input optical fields at an input field-of-view, the diffractive network comprising one or more optically transmissive and/or reflective substrate layers arranged in an optical path, each of the one or more optically transmissive and/or reflective substrate layers comprising a plurality of physical features formed on or within the one or more optically transmissive or reflective substrate layers and having different transmission and/or reflection properties as a function of the lateral coordinates across each substrate layer, wherein the one or more optically transmissive and/or reflective substrate layers and the plurality of physical features thereon collectively generate an output image that includes the one or more target classes of objects from the input images or input optical fields and substantially erases and/or distorts the one or more non-target classes of objects from the input images or input optical fields; and one or more optical image sensors or a plurality of photodetectors configured to capture the output image resulting from the one or more optically transmissive and/or reflective substrate layers; and wherein the output image is captured or digitized only if the one or more optical image sensors or the plurality of photodetectors detect an optical signal strength that is greater than a preset threshold level.

2. The diffractive camera of claim 1, wherein the one or more optically transmissive and/or reflective substrate layers are computationally designed during a training phase to define the plurality of physical features formed on or within the one or more optically transmissive or reflective substrate layers such that the diffractive network outputs the output image that includes the one or more target classes of objects and substantially erases and/or distorts the one or more non-target classes of objects.

3. The diffractive camera of claim 1, wherein the plurality of physical features of the one or more optically transmissive and/or reflective substrate layers comprise regions of varied thicknesses and/or varied optical properties.

4. The diffractive camera of claim 1, wherein the plurality of physical features of the one or more optically transmissive and/or reflective substrate layers comprise regions having different refractive index and/or absorption and/or spectral features.

5. The diffractive camera of claim 1, wherein the plurality of physical features of the one or more optically transmissive and/or reflective substrate layers comprise metamaterials and/or metasurfaces.

6. The diffractive camera of claim 1, wherein the one or more optically transmissive and/or reflective substrate layers comprise at least one nonlinear optical material.

7. The diffractive camera of claim 1, wherein the one or more optically transmissive and/or reflective substrate layers comprises one or more physical substrate layers that comprise reconfigurable physical features that can change as a function of time.

8. The diffractive camera of claim 1, wherein the images are captured within a region or part of the electromagnetic spectrum by the one or more optical image sensors or the plurality of photodetectors.

9. A diffractive network that receives an input optical field or image containing target and/or non-target class(es) of one or more objects at an input field-of-view, the diffractive network comprising one or more optically transmissive and/or reflective substrate layers arranged in an optical path, each of the one or more optically transmissive and/or reflective substrate layers comprising a plurality of physical features formed on or within the one or more optically transmissive or reflective substrate layers and having different transmission and/or reflection properties as a function of the lateral coordinates across each substrate layer, wherein the one or more optically transmissive and/or reflective substrate layers and the plurality of physical features thereon collectively generate a pixel-wise permuted output optical field or image that includes the target class(es) of the one or more objects from the input image or input optical field and substantially erases and/or distorts the non-target class(es) of the one or more objects from the input image or input optical field.

10. The diffractive network of claim 9, wherein the diffractive network is located in a portable device and/or camera.

11. The diffractive network of claim 9, wherein the output optical field or image is subject to an inverse permutation operation and projected onto a surface or eye.

12. The diffractive network of claim 9, wherein the one or more optically transmissive and/or reflective substrate layers are computationally designed during a training phase to define the plurality of physical features formed on or within the one or more optically transmissive or reflective substrate layers such that the diffractive network outputs the output optical field or image that includes the one or more target class(es) of objects and substantially erases and/or distorts the one or more non-target class(es) of objects.

13. The diffractive network of claim 9, wherein the plurality of physical features of the one or more optically transmissive and/or reflective substrate layers comprise regions of varied thicknesses and/or varied optical properties.

14. The diffractive network of claim 9, wherein the plurality of physical features of the one or more optically transmissive and/or reflective substrate layers comprise regions having different refractive index and/or absorption and/or spectral features.

15. The diffractive network of claim 9, wherein the plurality of physical features of the one or more optically transmissive and/or reflective substrate layers comprise metamaterials and/or metasurfaces.

16. The diffractive network of claim 9, wherein the one or more optically transmissive and/or reflective substrate layers comprises one or more physical substrate layers that comprise reconfigurable physical features that can change as a function of time.

17. A diffractive camera that captures one or more linearly transformed images containing one or more target classes of objects while all-optically erasing and/or distorting the optical signals corresponding to one or more non-target classes of objects, the diffractive camera comprising:

a diffractive network that receives one or more input images or input optical fields at an input field-of-view, the diffractive network comprising one or more optically transmissive and/or reflective substrate layers arranged in an optical path, each of the one or more optically transmissive and/or reflective substrate layers comprising a plurality of physical features formed on or within the one or more optically transmissive or reflective substrate layers and having different transmission and/or reflection properties as a function of the lateral coordinates across each substrate layer, wherein the one or more optically transmissive and/or reflective substrate layers and the plurality of physical features thereon collectively generate a linear transformation between pixels of the input images or input optical fields at the input field-of-view and pixels of an output field of view; and one or more optical image sensors or a plurality of photodetectors configured to capture a linearly transformed output image containing one or more target classes of objects while all-optically erasing and/or distorting the signals corresponding to the one or more non-target classes of objects resulting from the one or more optically transmissive and/or reflective substrate layers.

18. The diffractive camera of claim 17, further comprising image processing software and/or hardware configured to apply an inverse linear transformation to the linearly transformed output image to generate a final output image containing one or more target classes of objects while erasing and/or distorting the signals corresponding to one or more non-target classes of objects.

19. The diffractive camera of claim 18, wherein the linear transformation comprises a permutation matrix and the inverse linear transformation is the inverse of the permutation matrix.

20. The diffractive camera of claim 17, wherein the plurality of physical features of the one or more optically transmissive and/or reflective substrate layers comprise regions of varied thicknesses and/or varied optical properties.

21. The diffractive camera of claim 17, wherein the plurality of physical features of the one or more optically transmissive and/or reflective substrate layers comprise regions having different refractive index and/or absorption and/or spectral features.

22. The diffractive camera of claim 17, wherein the plurality of physical features of the one or more optically transmissive and/or reflective substrate layers comprise metamaterials and/or metasurfaces.

23. The diffractive camera of claim 17, wherein the one or more optically transmissive and/or reflective substrate layers comprises one or more physical substrate layers that comprise reconfigurable physical features that can change as a function of time.

24. The diffractive camera of claim 17, wherein the images are captured within a region or part of the electromagnetic spectrum by the one or more optical image sensors or the plurality of photodetectors.

25. A method of generating linearly transformed images containing one or more target classes of objects while all-optically erasing and/or distorting the optical signals corresponding to one or more non-target classes of objects, the method comprising:

providing a diffractive network that receives one or more input images or input optical fields at an input field-of-view, the diffractive network comprising one or more optically transmissive and/or reflective substrate layers arranged in an optical path, each of the one or more optically transmissive and/or reflective substrate layers comprising a plurality of physical features formed on or within the one or more optically transmissive or reflective substrate layers and having different transmission and/or reflection properties as a function of the lateral coordinates across each substrate layer, wherein the one or more optically transmissive and/or reflective substrate layers and the plurality of physical features thereon collectively generate a linear transformation between pixels of the input images or input optical fields at the input field-of-view and a transformed output image comprising pixels of an output field-of-view.

26. The method of claim 25, further comprising capturing the transformed output image containing one or more target classes of objects while all-optically erasing and/or distorting the signals corresponding to one or more non-target classes of objects resulting from the one or more optically transmissive and/or reflective substrate layers with one or more optical image sensors or a plurality of photodetectors.

27. The method of claim 26, further comprising applying an inverse linear transformation to the transformed output image with image processing software and/or hardware to generate a final output image containing one or more target classes of objects while erasing and/or distorting the signals corresponding to one or more non-target classes of objects.

* * * * *